US009376785B2

(12) United States Patent
Yumura et al.

(10) Patent No.: US 9,376,785 B2
(45) Date of Patent: Jun. 28, 2016

(54) SHOVEL, AND METHOD FOR CONTROLLING SHOVEL

(71) Applicant: SUMITOMO HEAVY INDUSTRIES, LTD., Tokyo (JP)

(72) Inventors: Masanori Yumura, Kanagawa (JP); Kazuya Yokoyama, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 37 days.

(21) Appl. No.: 14/103,999

(22) Filed: Dec. 12, 2013

(65) Prior Publication Data

US 2014/0100745 A1 Apr. 10, 2014

Related U.S. Application Data

(63) Continuation of application No. PCT/JP2012/066038, filed on Jun. 22, 2012.

(30) Foreign Application Priority Data

Jun. 28, 2011 (JP) .................................. 2011-143262

(51) Int. Cl.
*E02F 3/43* (2006.01)
*E02F 9/20* (2006.01)
*H02J 7/14* (2006.01)
*H02J 7/00* (2006.01)

(52) U.S. Cl.
CPC ................ *E02F 3/435* (2013.01); *E02F 9/2075* (2013.01); *E02F 9/2091* (2013.01); *H02J 7/1453* (2013.01); *H02J 2007/005* (2013.01)

(58) Field of Classification Search
CPC ........ E02F 3/435; E02F 9/2075; E02F 9/2091; H02J 7/1453; H02J 2007/005
See application file for complete search history.

(56) References Cited

U.S. PATENT DOCUMENTS

| 9,000,716 B2 * | 4/2015 | Kanbayashi et al. ......... 320/104 |
| 2011/0018551 A1 | 1/2011 | Yamane et al. |
| 2011/0273141 A1 | 11/2011 | Kanbayashi et al. |
| 2012/0038327 A1 | 2/2012 | Yokoyama |

FOREIGN PATENT DOCUMENTS

| EP | 0526874 | 2/1993 |
| JP | H09-084277 | 3/1997 |

(Continued)

OTHER PUBLICATIONS

International Search Report mailed on Sep. 18, 2012.

(Continued)

*Primary Examiner* — John Q Nguyen
*Assistant Examiner* — Alan D Hutchinson
(74) *Attorney, Agent, or Firm* — IPUSA, PLLC

(57) ABSTRACT

A shovel includes a lower traveling body; an upper rotating body provided on the lower traveling body; an electrical energy storage device provided on the upper rotating body; a converter connected to the electrical energy storage device; and a controller that controls the converter. The controller applies a current to the electrical energy storage device and the converter at the time of starting up the shovel, detects the status value after having applied the current, and controls the converter based on a comparison result between the detected status value and a predetermined value to restrict an output of the electrical energy storage device.

3 Claims, 14 Drawing Sheets

(56) References Cited

FOREIGN PATENT DOCUMENTS

| | | |
|---|---|---|
| JP | 2006-129588 | 5/2006 |
| JP | 2006-149181 | 6/2006 |
| JP | 2010-178446 | 8/2010 |
| WO | WO 2010/087363 | 8/2010 |
| WO | 2010/113223 | 10/2010 |

OTHER PUBLICATIONS

Extended European Search Report dated Feb. 11, 2015.

* cited by examiner

SHOVEL, AND METHOD FOR CONTROLLING SHOVEL

CROSS-REFERENCE TO RELATED APPLICATIONS

This is a continuation of International Application No. PCT/JP2012/066038, filed on Jun. 22, 2012, the entire contents of which are hereby incorporated by reference.

FIELD

The present invention is related to a shovel. In particular, the present invention is related to a shovel that includes an electrical energy storage device for supplying electric power to an electrical load.

BACKGROUND

An example of the shovel that includes the electrical energy storage device is a hybrid shovel. In general, in the hybrid shovel, a hydraulic pump is driven with an output of an engine to drive a hydraulic load, and an assist motor is driven with electric power supplied from the electrical energy storage device to assist the engine.

The electrical energy storage device includes an electrical energy storage part (an electrical energy storage unit or a storage battery) for storing electric power to supply the electric power if necessary. For example, an electrical double layer condenser or a lithium capacitor, or the like may be used as an electrical energy storage part.

An internal resistance of the capacitor depends on a temperature thereof such that the internal resistance becomes greater as the temperature becomes lower. A voltage variation when the capacitor is charged and discharged depends on the internal resistance of the capacitor such that the voltage variation becomes greater as the internal resistance becomes greater. Specifically, a capacitor voltage for a certain discharge current at a low temperature of the capacitor is lower than that at an ordinary temperature.

For example, a case is assumed where a shovel, in which the electrical energy storage device that has a capacitor with ordinary temperature requirements is installed, is operated in cold climates in which an outdoor temperature is minus 20 degree Celsius. In this case, the temperature of the capacitor at the time of starting the operation of the shovel is as low as the outdoor temperature, and thus the internal resistance of the capacitor is very great. If ordinary charge and discharge control is performed to generate a charge or discharge current of the capacitor, the voltage of the capacitor changes greatly. For example, when the voltage of the capacitor becomes extremely low, degradation of the capacitor is significantly accelerated.

In such a context, a hybrid type working machine that can restrain the charge or discharge current of the capacitor when the temperature of the capacitor becomes lower than or equal to a predetermined threshold is proposed (see Japanese Unexamined Patent Publication No. 2010-178446, for example, which is referred to as "Patent Document 1" hereinafter).

In general, the capacitor that is used for the electrical energy storage device of the shovel has such a characteristic that the electrical energy storage amount becomes smaller due to the degradation after the capacitor has been used for a long time. The electrical energy storage units other than the capacitor and the storage battery such a lithium ion battery also have the same degradation characteristic.

In general, it is known that a degradation manner (degradation speed) of the capacitor depends on the temperature and the voltage of the capacitor. The higher the temperature of the capacitor becomes, the higher the degradation speed becomes and thus the capacitor is degraded earlier. Further, the higher the voltage of the capacitor becomes, the higher the degradation speed becomes and thus the capacitor is degraded earlier. When the capacitor is degraded, the internal resistance becomes greater.

For example, there is a case where the internal resistance of the electrical double layer condenser at minus 40 degree Celsius is about 2.5 times higher than that at 20 degree Celsius. For example, there is a case where the internal resistance of the lithium capacitor at minus 20 degree Celsius is about 4.5 times higher than that at 20 degree Celsius.

Thus, if the shovel is operated at the site where the outdoor temperature is low, the internal resistance of the capacitor, which has already become high due to the degradation to a certain degree, becomes further high due to the low temperature, which causes the capacitor voltage to greatly change.

FIG. 1 is a diagram for illustrating a voltage variation of the capacitor at the low temperature. In FIG. 1, a solid line indicates the voltage variation of the capacitor where the outdoor temperature is ordinary (20 degree Celsius, for example) and the capacitor has an ordinary temperature, and a dotted line indicates the voltage variation of the capacitor where the outdoor temperature is low (minus 20 degree Celsius, for example) and the capacitor has a low temperature.

In FIG. 1, the discharge is started at time t1 and the discharge current Id1 is generated until time t2. After that, the charge is started at time t3 and the charge current Ic1 is generated until time t4. After that, the charge ends and the discharge starts at time t4, and the discharge current Id2 is generated until time t5.

In the case where the outdoor temperature is ordinary (20 degree Celsius, for example), when the discharge is started at time t1, the capacitor voltage slightly decreases due to a voltage drop that corresponds to the product of the discharge current and the internal resistance (see "A" portion in FIG. 1), as indicated by the solid line. At that time, because the temperature is ordinary and thus the internal resistance of the capacitor is not significantly great, the magnitude of the voltage drop is small. In this example, although the capacitor voltage further decreases due to the discharge from time t1 to time t2, it does not reach a system lower limit voltage. The system lower limit voltage is a lower limit value for the capacitor voltage that is set in a control system for the shovel. The charge and discharge control is performed by the control system such that the capacitor voltage does not fall below the system lower limit voltage.

When the discharge is stopped and the discharge current Id1 becomes 0 at time t2, the capacitor voltage slightly increases by an amount corresponding to the internal resistance (see "B" portion in FIG. 1). After that, when the charge is started at time t3, the capacitor voltage slightly increases due to a voltage rise that corresponds to the product of the charge current and the internal resistance (see "0" portion in FIG. 1), as indicated by the solid line. At that time, because the temperature is ordinary and thus the internal resistance of the capacitor is not significantly great, the magnitude of the voltage rise is small. Although the capacitor voltage further increases due to the charge from time t3 to time t4, it does not reach a system upper limit voltage. The system upper limit voltage is an upper limit value for the capacitor voltage that is set in a control system for the shovel. The charge and discharge control is performed by the control system such that the capacitor voltage does not exceed the system upper limit voltage.

When the charge ends and the discharge starts at time t4, the capacitor voltage decreases due to a voltage drop that corresponds to the product of the charge current, the discharge current and the internal resistance (see "D" portion in FIG. 1). At that time, because the temperature is ordinary and thus the internal resistance of the capacitor is not significantly great, the magnitude of the voltage drop is small. Although the capacitor voltage further decreases due to the discharge from time t4 to time t5, it does not reach the system lower limit voltage.

That is the variation in the capacitor voltage in the normal status indicated by the solid line in FIG. 1.

Next, the variation in the capacitor voltage in the case where the capacitor is at the low temperature is explained.

In the case where the outdoor temperature is low (minus 20 degree Celsius, for example), when the discharge is started at time t1, the capacitor voltage decreases due to a voltage fall that corresponds to the product of the discharge current and the internal resistance (see "E" portion in FIG. 1), as indicated by the dotted line. At that time, because the internal resistance of the capacitor is great due to the low temperature, the magnitude of the voltage fall is great and thus, in this example, the capacitor voltage drops below the system low limit voltage. If a system is configured such that the discharge limitation works when the capacitor voltage drops below the system low limit voltage, the ordinary discharge current Id1 cannot be generated due to the discharge limitation. As a result of this, the electronic control of the shovel is not appropriately performed, which can lead to a problem in the operations of the shovel.

In contrast, a case where the discharge limitation does not work when the capacitor voltage drops below the system low limit voltage is assumed. In this case, because the discharge current Id1 is generated from time t1 to time t2, the capacitor voltage, which has fallen below the system low limit voltage, continues to further decrease due to the discharge even through it decreases gradually (see "F" portion in FIG. 1). The lower limit voltage is a rated voltage that indicates a lower limit for use of the capacitor. For example, in the case of the lithium capacitor, when the capacitor voltage becomes smaller than or equal to the lower limit voltage, the degradation of the capacitor is significantly accelerated. In the case of the electrical double layer condenser, the lower limit voltage is 0, and thus the lower limit voltage is not set.

When the discharge is stopped and the discharge current Id1 becomes 0 at time t2, the capacitor voltage increases by an amount corresponding to the internal resistance. After that, when the charge is started at time t3, the capacitor voltage increases due to a voltage rise that corresponds to the product of the charge current and the internal resistance (see "G" portion in FIG. 1), as indicated by the dotted line. At that time, because the internal resistance of the capacitor is great due to the low temperature, the magnitude of the voltage rise is great and thus the capacitor voltage exceeds the system upper limit voltage. When the capacitor voltage exceeds the system upper limit voltage, the charge limitation works and the ordinary discharge current Ic1 cannot be generated. As a result of this, the electronic control of the shovel is not appropriately performed, which can lead to a problem in the operations of the shovel.

In contrast, a case where the charge limitation does not work when the capacitor voltage exceeds the system upper limit voltage is assumed. In this case, because the charge current Ic1 is generated from time t1 to time t2, the capacitor voltage, which has exceeded the system upper limit voltage, continues to further increase due to the charge even through it increases gradually (see "H" portion in FIG. 1). The upper limit voltage is a rated voltage that indicates an upper limit for use of the capacitor. For example, when the capacitor voltage becomes greater than or equal to the upper limit voltage, the degradation of the capacitor is significantly accelerated.

When the charge ends and the discharge starts at time t4, the capacitor voltage decreases due to a voltage drop that corresponds to the product of the charge current, the discharge current and the internal resistance. At that time, because the internal resistance of the capacitor is great due to the low temperature, the magnitude of the voltage fall is great and thus the capacitor voltage drops below the system low limit voltage again. If the discharge is continued, the capacitor voltage further decreases to be below the lower limit voltage.

In this way, when the internal resistance of the capacitor becomes great due to the low temperature, the voltage variation at the time of the charge and the discharge of the capacitor becomes great, which often leads to a situation where the system upper limit voltage or the system lower limit voltage is exceeded so that the charge and discharge control cannot be performed and the degradation of the capacitor is significantly accelerated.

In such a configuration in which the charge and discharge control is performed when the capacitor voltage is lower than a threshold, as disclosed in Patent Document 1, it is necessary to appropriately set the threshold. If the threshold for the system lower limit is too high, the discharge limit may easily work, because the capacitor voltage becomes lower than the threshold only if the temperature of the capacitor decreases by a small amount (i.e., only if the internal resistance of the capacitor increases by a small amount), which may lead to the problem in the operations of the shovel. On the other hand, if the threshold for the system lower limit is too low, the capacitor voltage does not easily becomes lower than the threshold even if the temperature of the capacitor becomes significantly low (i.e., even if the internal resistance of the capacitor becomes significantly great), which may accelerate the degradation of the capacitor due to the significant low capacitor voltage.

Here, if the internal resistance of the capacitor is constant at the ordinary temperature and the internal resistance of the capacitor always changes in the same way with the change in the temperature, it is possible to set the constant threshold. However, the internal resistance of the capacitor depends on the degradation level of the capacitor, and a rate of change in the internal resistance with respect to the change in the temperature depends on the degradation level of the capacitor. Specifically, in the case of the capacitor which has been degraded significantly, the internal resistance of the capacitor is great even at the ordinary temperature, and the change amount of the capacitor voltage at the time of the charge and the discharge is great. Thus, unless the threshold is set in consideration of the degradation level of the capacitor, the charge and discharge control cannot be performed appropriately as the degradation level of the capacitor becomes high.

SUMMARY

According to an embodiment of the present invention, a shovel is provided, which includes a lower traveling body; an upper rotating body provided on the lower traveling body; an electrical energy storage device provided on the upper rotating body; a converter connected to the electrical energy storage device; a status detector that detects a status value representing a status of the electrical energy storage device; and a controller that controls the converter, wherein the controller applies a current to the electrical energy storage device and the converter at the time of starting up the shovel, detects the status value after having applied the current, compares the detected status value with a predetermined value, and controls the converter based on a comparison result to restrict an output of the electrical energy storage device.

According to another embodiment, a method of controlling a shove is provided, which includes: applying a current to an electrical energy storage device and a converter in the shovel at the time of starting up the shovel; detecting a status value after having applied the current, the status value representing a status of the electrical energy storage device; and controlling the converter based on a comparison result between the detected status value and a predetermined value to restrict an output of the electrical energy storage device.

Other objects, features, advantages of the present invention will be understood more clearly when a detailed description of the invention hereinafter is read with reference to the accompanying drawings.

DESCRIPTION OF EMBODIMENTS

In the following, embodiments will be described with reference to the accompanying drawings.

Figure 1:
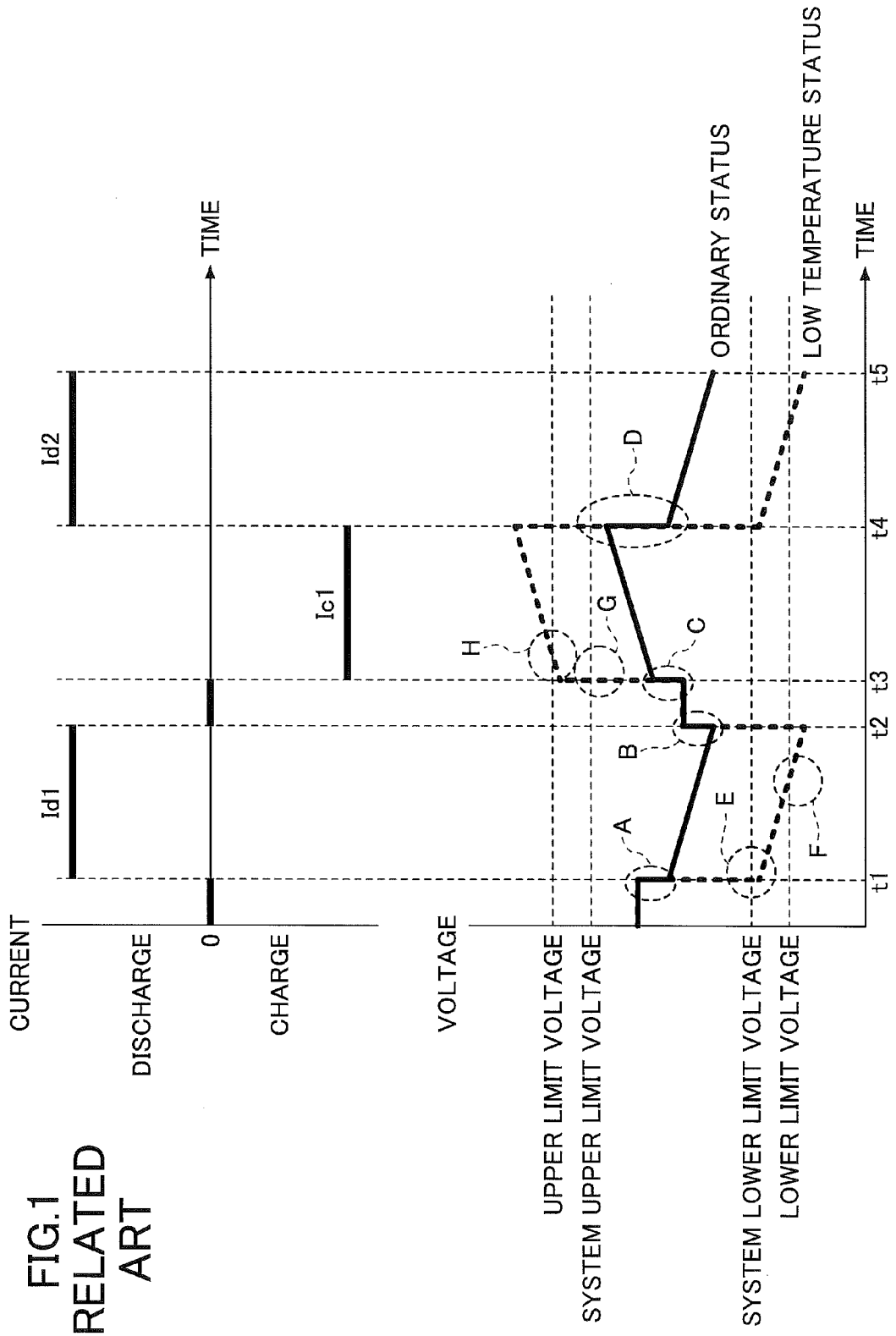
FIG. 1 is a diagram for illustrating a voltage variation of a capacitor at a low temperature.
Figure 2:
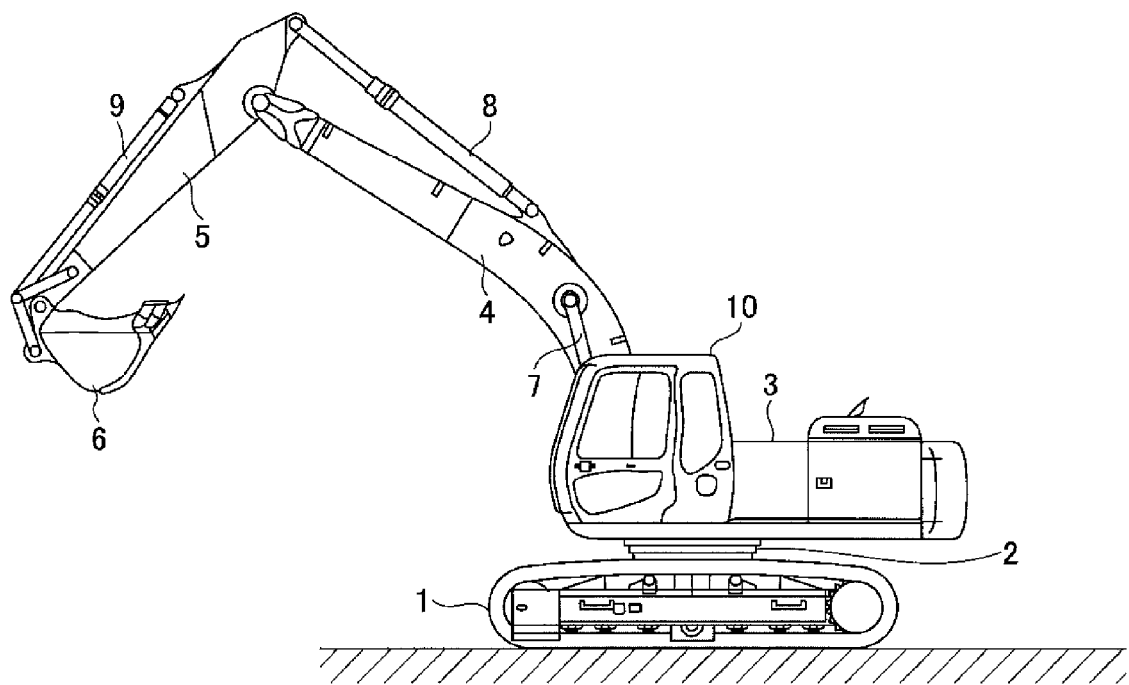
FIG. 2 is a side view of a hybrid shovel.

FIG. 2 is a side view of a hybrid shovel that is an example of a shovel to which the present invention is applied. A shovel to which the present invention can be applied is not limited to the hybrid shovel. The present invention can be applied to other shovels and working machines as long as they include an electrical working element or an electrical load that is driven by electric power from an electrical energy storage device.

According to the hybrid shovel illustrated in FIG. 2, an upper rotating body 3 is mounted on a lower traveling body 1 via a rotating mechanism 2. A boom 4 is attached to the upper rotating body 3. An arm 5 is attached to an end of the boom 4, and a bucket 6 is attached to an end of the arm 5. The boom 4, the arm 5 and the bucket 6 are hydraulically driven with means of a boom cylinder 7, an arm cylinder 8 and a bucket cylinder 9, respectively. A cabin 10 is mounted on the upper rotating body 3, and power sources such as an engine are mounted on the upper rotating body 3.

Figure 3:
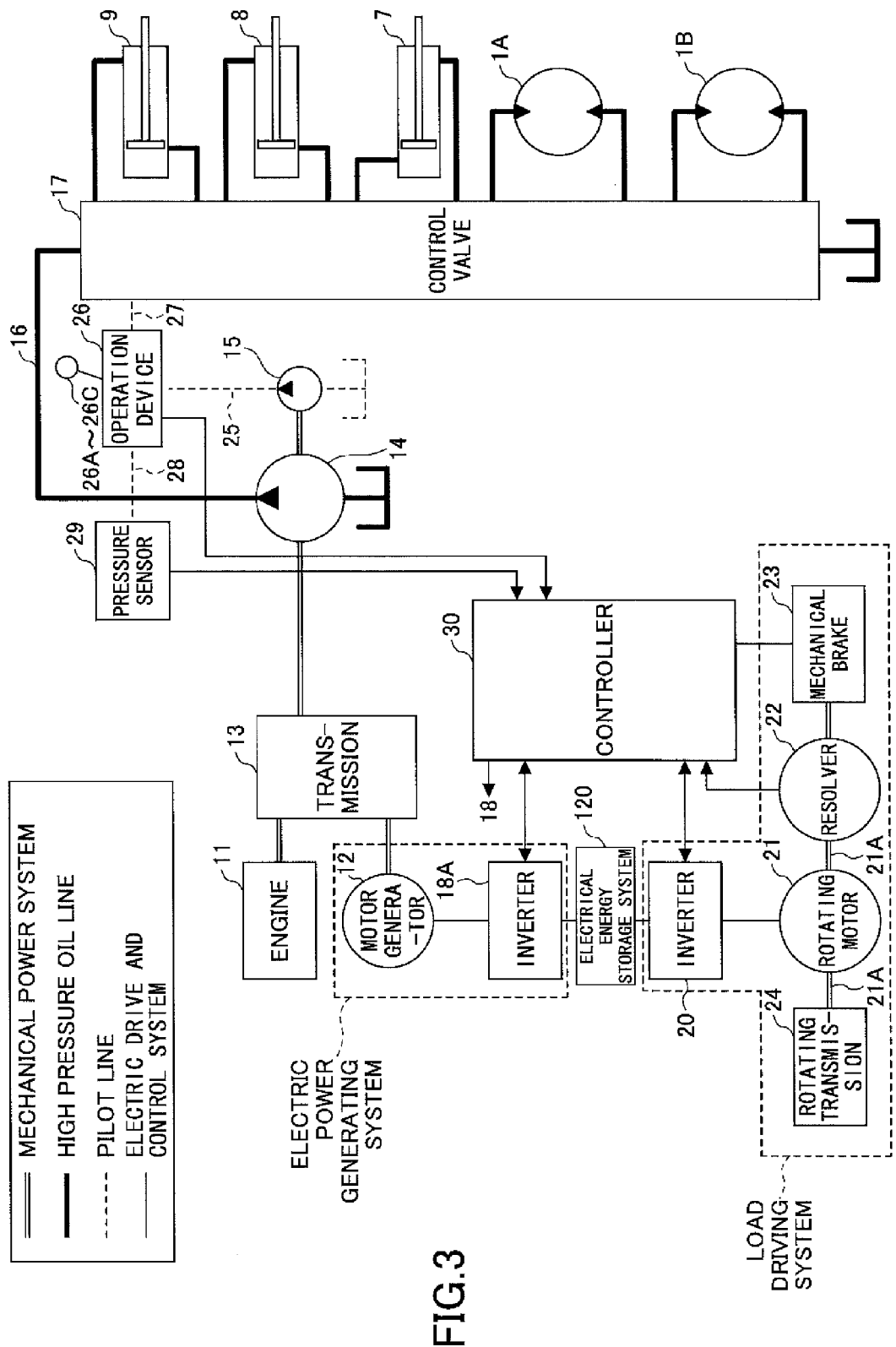
FIG. 3 is a block diagram for illustrating a drive system of the hybrid shovel according to an embodiment.

FIG. 3 is a block diagram for illustrating a drive system of the hybrid shovel illustrated in FIG. 2. In FIG. 3, a mechanical connection is indicated by a double line, a high pressure hydraulic line is indicated by a wide solid line, a pilot line is indicated by a broken line, and a connection related to an electric drive or control system is indicated by a solid line.

An engine 11 as a mechanical drive source and a motor generator 12 as an assist drive source are connected to two input axes of a transmission 13, respectively. A main pump 14 and a pilot pump 15 as hydraulic pumps are connected to an output shaft of the transmission 13. The main pump 14 is connected to a control valve 17 via a high pressure oil line 16. The main pump 14 is a variable displacement pump in which a discharge fluid rate can be controlled by controlling an angle of a swash plate to adjust stroke lengths of pistons.

The control valve 17 is a control apparatus for controlling a hydraulic system of the hybrid shovel. Hydraulic motors 1A (for right side), 1B (for left side) for the lower traveling body 1, the boom cylinder 7, the arm cylinder 8 and the bucket cylinder 9 are connected to the control valve 17 via high pressure hydraulic lines.

An electrical energy storage system (electrical energy storage device) including an electrical energy storage unit is connected to the motor generator 12 via an inverter 18A. An operation device 26 is connected to the pilot pump 15 via a pilot line 25. The operation device 26 includes levers 26A and 26B and a pedal 26C. The levers 26A and 26B and the pedal 26C are connected to the control valve 17 and a pressure sensor 29 via hydraulic lines 27 and 28, respectively. The pressure sensor 29 is connected to a controller 30 for controlling an electric system.

The controller 30 controls operations (switching between an assist (power running) operation and a power generating operation) of the motor generator 12. The controller 30 also controls charge and discharge of the electrical energy storage unit (a capacitor) by controlling a step-up and step-down transformer as a step-up/down transform controlling part. The controller 30 performs switching control between the step-up operation and the step-down operation of a step-up and step-down transformer based on a charge status of the electrical energy storage unit (capacitor) and the operation status (an assist (power running) operation and a power generating operation) of the motor generator 12 to control charge and discharge of the electrical energy storage unit (capacitor).

The switching control between the step-up operation and the step-down operation of the step-up and step-down transformer is performed based on a DC bus voltage value, which is detected by a DC bus voltage detector in a DC bus, an electrical energy storage unit voltage value, which is detected by an electrical energy storage unit voltage detector, and an electrical energy storage unit current value, which is detected by an electrical energy storage unit current detector.

Further, a SOC (State of Charge) of the electrical energy storage unit (capacitor) is calculated based on the electrical energy storage unit voltage value detected by an electrical energy storage unit voltage detector. In the foregoing, the capacitor is an example of the electrical energy storage unit; however, the electrical energy storage unit may be a rechargeable secondary battery such as a lithium ion battery, etc., or a power supply in other forms that can accept the electric power.

The hybrid shovel illustrated in FIG. 3 is configured such that a rotating mechanism is motor-operated, and a rotating motor 21 for driving the rotating mechanism 2 is provided. The rotating motor 21 as a motor-operated working element is connected to the electrical energy storage system 120 via an inverter 20. A resolver 22, a mechanical brake 23 and a rotating transmission 24 are connected to a rotating shaft 21a of the rotating motor 21. A load drive system is formed by the rotating motor 21, the resolver 22, the mechanical brake 23 and the rotating transmission 24.

Returning to FIG. 3, the controller 30 controls, as a main controlling part, the hybrid shovel. The controller 30 is formed by an arithmetic processing device including a CPU (Central Processing Unit) and an internal memory. The functions of the controller 30 are implemented when the CPU executes programs for drive controls stored in the internal memory.

The controller 30 converts a signal supplied from the pressure sensor 29 to a speed instruction to control the rotating motor 21. The signal supplied from the pressure sensor 29 corresponds to a signal that represents an operation amount when the operation device 26 is operated for rotating the rotating mechanism 2.

The controller 30 controls operations (switching between an assist (power running) operation and a power generating operation) of the motor generator 12. The controller 30 also controls charge and discharge of the capacitor 19 by controlling a step-up and step-down transformer 100 (see FIG. 4) (an example of a converter) as a step-up/down transform controlling part. The controller 30 switches between the step-up operation and the step-down operation of the step-up and step-down transformer 100 based on a charge status of the capacitor 19, the operation status (an assist (power running) operation and a power generating operation) of the motor generator 12, and the operation status (a power running operation and a regenerating operation) of the rotating motor 21 to control charge and discharge of the capacitor 19.

The switching control between the step-up operation and the step-down operation of the step-up and step-down transformer 100 is performed based on a DC bus voltage value, which is detected by a DC bus voltage detector 111, a capacitor voltage value, which is detected by a capacitor voltage detector 112, and a capacitor current value, which is detected by the capacitor current detector 113.

According to the configuration described above, the electric power generated by the motor generator 12 as the assist motor is supplied to a DC bus 110 (see FIG. 4) of the electrical energy storage system 120 via an inverter 18A and then to the capacitor 19 via the step-up and step-down transformer 100. The regenerated electric power generated by the regenerating operation of the rotating motor 21 is supplied to the DC bus 110 of the electrical energy storage system 120 via the inverter 18A and then to the capacitor 19 via the step-up and step-down transformer 100.

Figure 4:
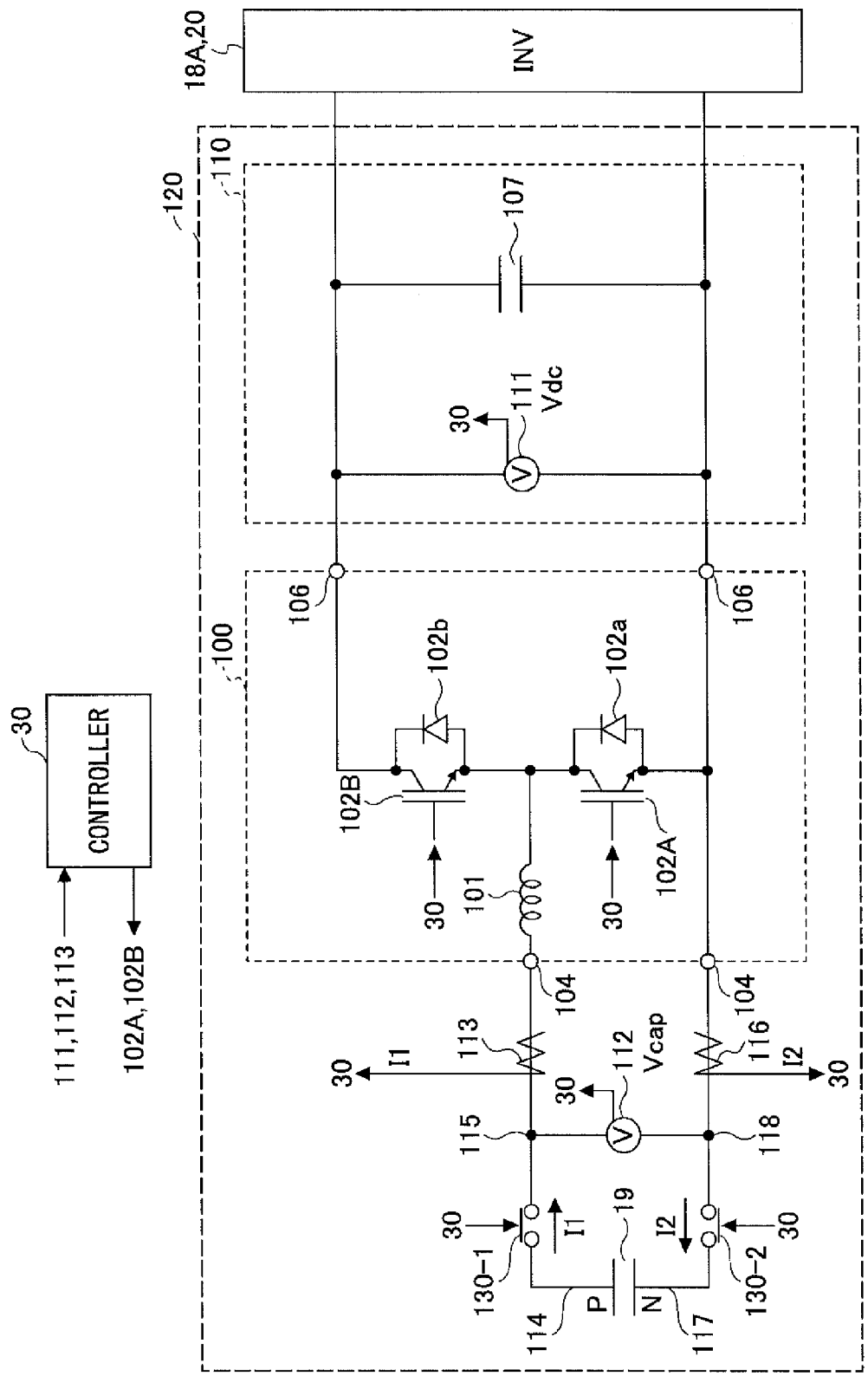
FIG. 4 is a diagram for illustrating a circuit of an electrical energy storage system.

FIG. 4 is a diagram for illustrating a circuit of an electrical energy storage system. The step-up and step-down transformer 100 includes an inductor 101, an IGBT (Insulated Gate Bipolar Transistor) 102A for step-up transformation, an IGBT 102B for step-down transformation, power supply connector terminals 104 for connecting to the capacitor 19, a pair of output terminals 106 for connecting to the inverters 18A and 20, and a smoothing condenser 107 inserted in parallel with the output terminals 106. The output terminals 106 of the step-up and step-down transformer 100 are connected to the inverters 18A and 20 via the DC bus 110.

One end of the inductor 101 is connected to a midpoint between the IGBT 102A for step-up transformation and the IGBT 102B for step-down transformation, and another end of the inductor 101 is connected to the power supply connector terminals 104. The inductor 101 is provided for supplying an induced electromotive force generated due to ON/OFF operations of the IGBT 102A for step-up transformation to the DC bus 110.

The IGBT 102A for step-up transformation and the IGBT 102B for step-down transformation are semiconductor elements (switching elements) that are formed by bipolar transistors which have MOSFETs (Metal Oxide Semiconductor Field Effect Transistors) incorporated in gate portions, and are capable of switching a bulk power at high speed. The IGBT 102A for step-up transformation and the IGBT 102B for step-down transformation are driven with a PWM voltage applied to the gates by the controller 30. The IGBT 102A for step-up transformation and the IGBT 102B for step-down transformation are connected to diodes 102a and 102b in parallel which are rectifying elements.

The capacitor 19 may be a rechargeable electrical energy storage unit such that the electric power can be supplied from and to the DC bus 110 via the step-up and step-down transformer 100. It is noted that in FIG. 4, the capacitor 19 is an example of the electrical energy storage unit; however, it is also possible to use, instead of the capacitor 19, a rechargeable secondary battery such as a lithium ion battery, etc., a lithium ion capacitor, or a power supply in other forms that can accept the electric power.

The power supply connector terminals 104 and the output terminals 106 may be any terminals which can be connected to the capacitor 19 and the inverters 18A and 20. The capacitor voltage detector 112 for detecting a capacitor voltage is connected between the power supply connector terminals 104. The DC bus voltage detector 111 for detecting a DC bus voltage is connected between the output terminals 106.

The capacitor voltage detector 112 detects a voltage value Vcap of the capacitor 19. The DC bus voltage detector 111 detects a voltage value Vcap of the DC bus 110. The smoothing condenser 107 is inserted between the positive terminal and the negative terminal of the output terminals 106 for smoothing the DC bus voltage. The smoothing condenser 107 has a function of keeping the voltage of the DC bus 110 at a predetermined voltage.

The capacitor current detector 113 detects a value of a current that is generated at a positive terminal (P terminal) side of the capacitor 19. The capacitor current detector 113 includes a resistance for detecting the current. Specifically, the capacitor current detector 113 detects a current value I1 at the positive terminal of the capacitor 19. On the other hand, the capacitor current detector 117 detects a value of a current that is generated at a negative terminal (N terminal) side of the capacitor 19. The capacitor current detector 117 includes a resistance for detecting the current. Specifically, the capacitor current detector 117 detects a current value I2 at the negative terminal of the capacitor 19.

When the step-up operation of the step-up and step-down transformer 100 is performed to step up the voltage of the DC bus 110, the PWM voltage is applied to the IGBT 102A for step-up transformation. At that time, the induced electromotive force generated at the inductor 101 due to ON/OFF operations of the IGBT 102A for step-up transformation is supplied to the DC bus 110 via a diode 102b that is connected in parallel to the IGBT 102B for step-down transformation. In this way, the voltage of the DC bus 110 is stepped up.

When the step-down operation of the step-up and step-down transformer 100 is performed to step down the voltage of the DC bus 110, the PWM voltage is applied to the IGBT 102B for step-down transformation. At that time, regenerated power is supplied from the DC bus 110 to the capacitor 19 via the IGBT 102B for step-down transformation. In this way, the electric power accumulated at the DC bus 110 is used to charge the capacitor and the voltage of the DC bus 110 is stepped down.

According to the embodiment, a relay 130-1 for breaking a power supply line 114 as a circuit breaker is provided in the power supply line 114 that connects the positive terminal of the capacitor 19 to the power supply connector terminal 104 of the step-up and step-down transformer 100. The relay 130-1 is disposed between a connection point 115 of the capacitor voltage detector 112 to the power supply line 114 and the positive terminal of the capacitor 19. The relay 130-1 is operated based on a signal from the controller 30 for breaking the power supply line 114 from the capacitor 19, which enables disconnecting the capacitor 19 from the step-up and step-down transformer 100.

Further, a relay 130-2 for breaking a power supply line 117 as a circuit breaker is provided in the power supply line 117 that connects the negative terminal of the capacitor 19 to the power supply connector terminal 104 of the step-up and step-down transformer 100. The relay 130-2 is disposed between a connection point 118 of the capacitor voltage detector 112 to the power supply line 117 and the negative terminal of the capacitor 19. The relay 130-2 is operated based on a signal from the controller 30 for breaking the power supply line 117 from the capacitor 19, which enables disconnecting the capacitor 19 from the step-up and step-down transformer 100. It is noted that the relays 130-1 and 130-2 are may be integrated as a single relay for simultaneously breaking the power supply line 114 on the positive terminal side and the power supply line 117 on the negative terminal side to disconnect the capacitor.

It is noted that, in a practical embodiment, a driver part is provided between the controller 30 and the IGBTs 102A and 102B for generating the PWM signals for driving the IGBT 102A for step-up transformation and the IGBT 102B for step-down transformation between the controller 30 and the IGBT 102A for step-up transformation and the IGBT 102B for step-down transformation; however, the driver part is not illustrated in FIG. 4. Such a driver part may be implemented by an electric circuit or an arithmetic processing device.

First Embodiment

Next, charge and discharge control for the capacitor in the shovel according to a first embodiment of the present invention is described. According to the first embodiment, the charge and discharge control for the capacitor 19 is performed at a low temperature in the hybrid shovel with the configuration described above such that an output of the capacitor 19 is appropriately constrained.

Figure 5:
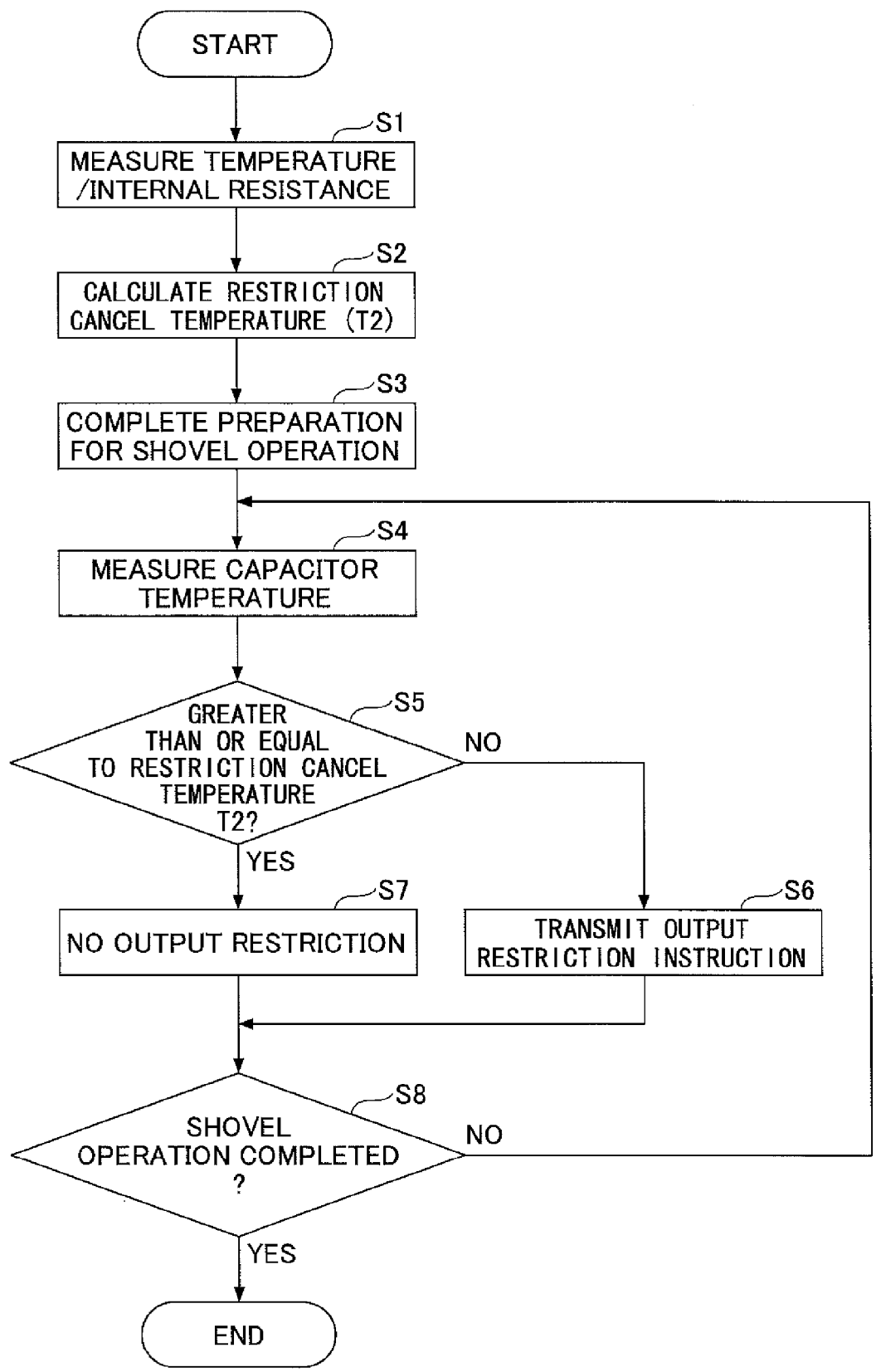
FIG. 5 is a flowchart of an output restriction process according to a first embodiment.
Figure 6:
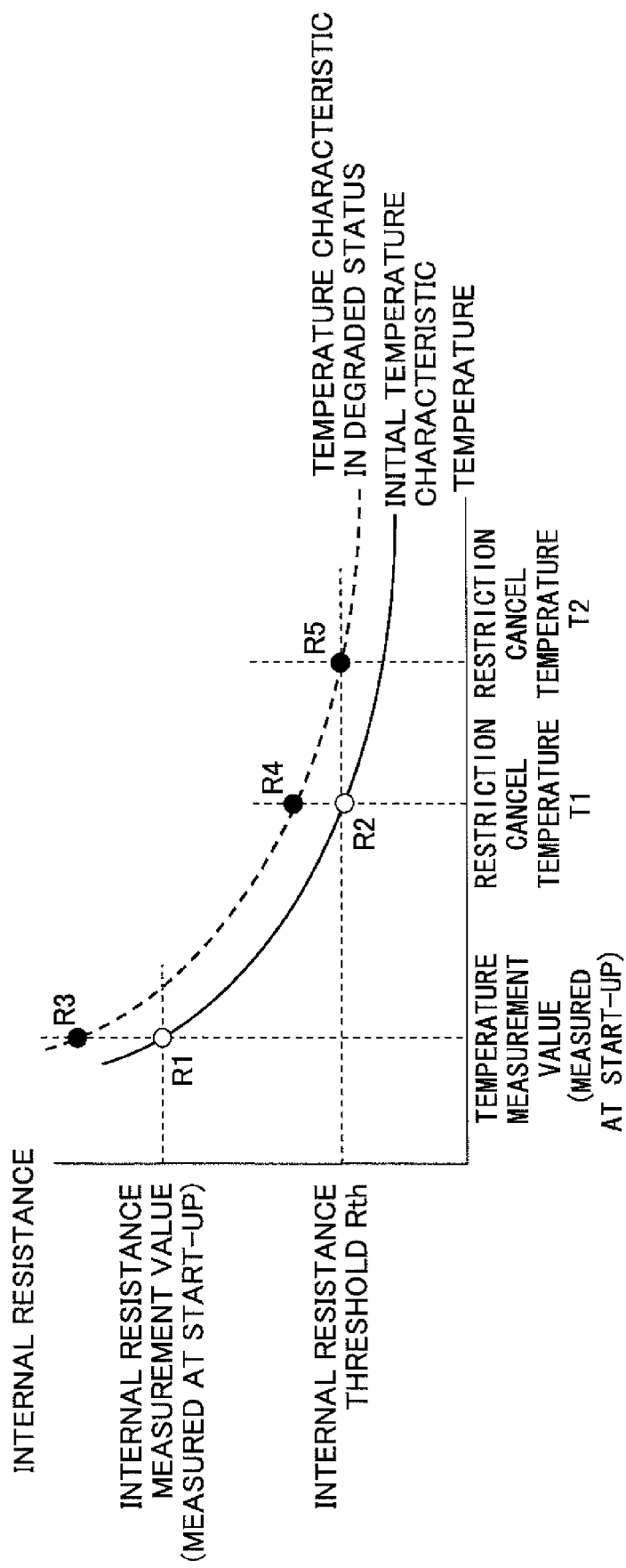
FIG. 6 is a graph for illustrating a relationship between temperature and internal resistance of a capacitor.

FIG. 5 is a flowchart of an output restriction process according to the first embodiment. FIG. 6 is a graph for illustrating a relationship between temperature and internal resistance of the capacitor.

The output restriction process illustrated in FIG. 5 is executed mainly by the controller. The output restriction process is initiated immediately after a start switch for the engine 11 is turned on. At first, in step S1, the temperature of the capacitor 19 and the internal resistance of the capacitor 19 are measured. The internal resistance of the capacitor 19 can be determined by measuring the change in the voltage of the capacitor 19 when the current applied to the capacitor 19 is changed, for example.

Next, in step S2, a restriction cancel temperature T2 is calculated. The restriction cancel temperature T2 is a temperature at which the internal resistance of the capacitor 19 become a threshold Rth. A way of calculating the restriction cancel temperature T2 is described hereinafter.

A relationship between the temperature and the internal resistance of the capacitor 19 is such as illustrated by a solid line or a dotted line in FIG. 6. If the internal resistance at a certain temperature is known, the restriction cancel temperature T2 can be determined based on a temperature-internal resistance characteristic curve. The solid line in FIG. 6 indicates the temperature-internal resistance characteristic curve in an initial status of the capacitor 19 in which the capacitor 19 is not degraded, and the dotted line in FIG. 6 indicates the temperature-internal resistance characteristic curve in a status of the capacitor 19 in which the capacitor 19 is degraded to some degree. The temperature-internal resistance characteristic curve (indicated by dotted line) in the status of the capacitor 19 in which the capacitor 19 is degraded is moved in an upper direction in parallel with respect to the temperature-internal resistance characteristic curve (indicated by solid line) in the initial status of the capacitor 19 in which the capacitor 19 is not degraded. Thus, by determining in advance the temperature-internal resistance characteristic curve (indicated by solid line) in the initial status of the capacitor 19 in which the capacitor 19 is not degraded, the temperature-internal resistance characteristic curve after the capacitor 19 has been degraded to some degree can be determined based on the internal resistance value and the temperature at that time.

In the case of the example illustrated in FIG. 6, it is assumed that the temperature-internal resistance characteristic curve (indicated by solid line) in the initial non-degraded status of the capacitor 19 is determined in advance. Thus, the internal resistance R1 of the capacitor 19 in the non-degraded status of the capacitor 19 can be determined based on the temperature measured in step S1.

If the internal resistance of the capacitor 19 measured in step S1 is R3, the current temperature-internal resistance characteristic curve (indicated by dotted line) of the capacitor 19 can be determined by moving the predetermined temperature-internal resistance characteristic curve (indicated by solid line) in an upper direction parallel to itself by an amount (R3−R1).

When the temperature of the capacitor 19 is increased, the internal resistance of the capacitor 19 becomes lower. When the temperature of the capacitor 19 has been decreased to a certain temperature, an ordinary charge/discharge current to or from the capacitor 19 can be generated. It is assumed that the temperature at which the ordinary charge/discharge current to or from the capacitor 19 can be generated in the initial non-degraded status of the capacitor 19 is restriction cancel temperature T1, and the internal resistance value of the capacitor 19 at that time is R2. In other words, the temperature of the capacitor 19 when the internal resistance of the capacitor 19 is decreased to the threshold Rth corresponds to the restriction cancel temperature T1, and the internal resistance value R2 of the capacitor 19 corresponds to the threshold Rth.

If the capacitor 19 is in the initial non-degraded status, the output restriction on the capacitor 19 may be canceled when the temperature of the capacitor 19 becomes lower than or equal to the restriction cancel temperature T1. However, if the capacitor 19 is degraded to have the temperature-internal resistance characteristic curve indicated by the dotted line in FIG. 6, the internal resistance value is R4 when the temperature of the capacitor 19 becomes the restriction cancel temperature T1, and R4 is higher than the internal resistance value R2 (i.e., the threshold Rth). Thus, the temperature at which the internal resistance value becomes R5 (=R2=Rth) is determined using the temperature-internal resistance characteristic curve (indicated by dotted line) in the degraded status of the capacitor 19. This temperature corresponds to the restriction cancel temperature T2.

Returning to the flowchart illustrated in FIG. 5, after the restriction cancel temperature T2 has been calculated in step S2, the preparation for operating the shovel is completed and the working with the shovel is started. Thus, the motor generator (assist motor) 12 and the rotating motor 21 are in a status in which they can be driven. The motor generator 12 is driven, and the rotating motor 21 is driven due to the working. Next, in step S4, the temperature of the capacitor 19 is measured. Then, in step S5, it is determined whether the temperature of the capacitor 19 measured in step S4 is greater than or equal to the restriction cancel temperature T2.

In step S5, if it is determined that the temperature of the capacitor 19 is not greater than or equal to the restriction cancel temperature T2 (NO in step S5), the output restriction process goes to step S6. The internal resistance value of the capacitor 19 is R3 or R4 illustrated in FIG. 6, for example. In step S6, an output restriction instruction for the capacitor 19 is transmitted from the controller 30 to the electrical energy storage system 120. As a result of this, the restriction is applied to the charge and discharge of the capacitor 19. The restriction on the charge and discharge includes limiting the charge and discharge currents to small values. By limiting the charge and discharge currents to and from the capacitor 19 to small values, it becomes possible to reduce the sudden voltage fall or voltage rise due to the increased internal resistance of the capacitor 19. With this arrangement, the voltage at the times of charge and discharge of the capacitor 19 at a low temperature can be held between the system lower limit voltage and the system upper limit voltage, for example. Further, the restrained output of the charge and discharge can warm up the capacitor 19.

After the process in step S6 is completed, in step SB, it is determined whether the operation of the shovel is completed. If the operation of the shovel is completed (YES in step S8), the output restriction process ends. If the operation of the shovel is not completed (NO in step S8), the output restriction process returns to step S4.

On the other hand, in step S5, if it is determined that the temperature of the capacitor 19 is greater than or equal to the restriction cancel temperature T2 (YES in step S5), the output restriction process goes to step S7. The internal resistance value of the capacitor 19 is R5 illustrated in FIG. 6, for example. In step S7, an output restriction cancel instruction for the capacitor 19 is transmitted from the controller 30 to the electrical energy storage system 120. As a result of this, the restriction on the charge and discharge of the capacitor 19 is canceled and an ordinary charge and discharge control for the capacitor 19 is performed.

After the process in step S7 is completed, in step S8, it is determined whether the operation of the shovel is completed. If the operation of the shovel is completed (YES in step S8), the output restriction process ends. If the operation of the shovel is not completed (NO in step S8), the output restriction process returns to step S4. This process is repeated until the working with the shovel is completed.

According to the output restriction process described above, if the working of the shovel is started when the temperature of the capacitor 19 is low, for example, the temperature of the capacitor 19 immediately after the operation of the shovel has been started is lower than the restriction cancel temperature until the capacitor is warmed up. Thus, the output restriction process goes to step S6 due to "NO" in step S5, resulting in the restriction on the output of the capacitor 19. When the temperature of the capacitor 19 becomes greater than or equal to the restriction cancel temperature after the operation of the shovel is continued and the capacitor 19 is in the warmed up status, the output restriction process goes to step S7 due to "YES" in step S5. As a result of this, the restriction on the output of the capacitor 19 is canceled and the ordinary charge and discharge control for the capacitor 19 can be applied. Because the restriction on the output of the capacitor 19 is canceled when the temperature of the capacitor 19 becomes the restriction cancel temperature T2 which is determined in consideration of the increase in the internal resistance of the capacitor 19 due to the degradation at that time, the restriction on the output can be canceled when the temperature of the capacitor 19 becomes an appropriate temperature, regardless of the degradation level of the capacitor 19. With this arrangement, even if the shovel is started up at the low temperature, it is possible to warm up the capacitor 19 while suppressing the degradation of the capacitor and thus immediately return to the ordinary charge and discharge control.

As described above, in the embodiment, the status of the capacitor is detected based on the temperature of the capacitor 19, and the temperature of the capacitor 19 corresponds to a status value representing the status of the capacitor 19. Further, the status detector is implemented when the controller 30 measures the temperature of the capacitor 19 in step S4.

As described above, because the working of the shovel can be started while performing the output restriction, a delay at the time of starting the working with the shovel can be prevented. In other words, it is possible to prevent the delay time from the time of starting the operation of the engine of the shove to the time when the working with the shovel can be actually started.

Second Embodiment

In the following, a second embodiment is described. According to the second embodiment, instead of canceling the output restriction when the temperature of the capacitor 19 is greater than or equal to the restriction cancel temperature T2 as in the first embodiment, the output restriction is canceled when the internal resistance of the capacitor 19 is less than or equal to the threshold Rth. In other words, according to the second embodiment, the current internal resistance of the capacitor 19 is calculated successively, and the output restriction is canceled based on the calculated internal resistance.

Figure 7:
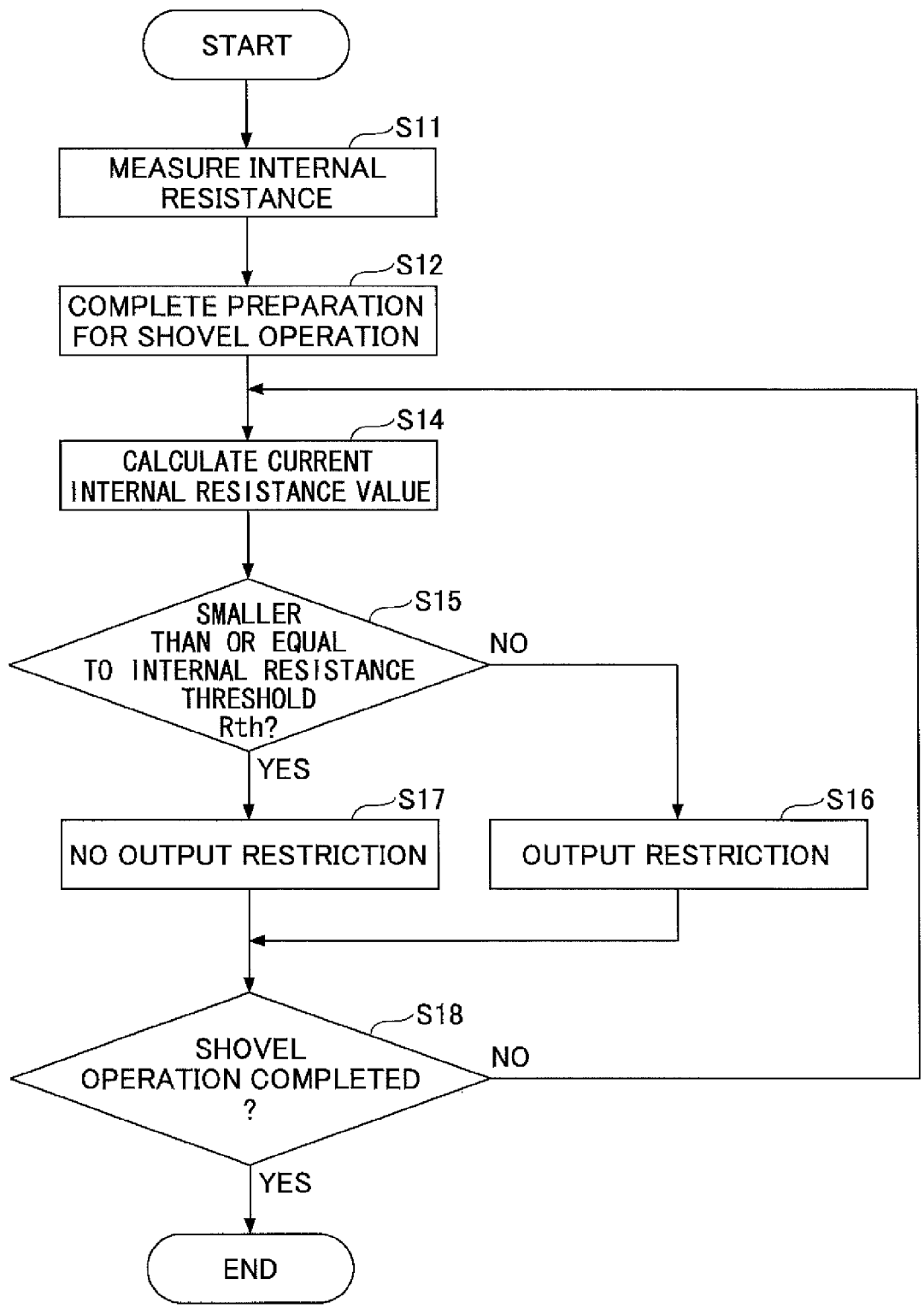
FIG. 7 is a flowchart of an output restriction process according to a second embodiment.

FIG. 7 is a flowchart of an output restriction process according to the second embodiment. The relationship between the temperature and the internal resistance of the capacitor 19 is the same as that illustrated in FIG. 6, and thus the explanation is also made with reference to FIG. 6.

The output restriction process illustrated in FIG. 7 is executed mainly by the controller. The output restriction process is initiated immediately after a start switch for the engine 11 is turned on. At first, in step S11, internal resistance of the capacitor 19 is measured. The internal resistance of the capacitor 19 can be determined by measuring the change in the voltage of the capacitor 19 when the current applied to the capacitor 19 is changed, for example. The internal resistance measured at that time corresponds to R3 illustrated in FIG. 6.

In step S12, the preparation for the operation of the shovel is completed and the working with the shovel is started. Thus, the motor generator (assist motor) 12 and the rotating motor 21 are in a status in which they can be driven. The motor generator 12 is driven, and the rotating motor 21 is driven due to the working. Then, in step S14, the current internal resistance value of the capacitor 19 is calculated.

Next, in step S15, it is determined whether the current internal resistance value of the capacitor 19 is smaller than or equal to the threshold Rth for the internal resistance value. If it is determined that the current internal resistance value of the capacitor 19 is not smaller than or equal to the threshold Rth for the internal resistance value (NO in step S15), the output restriction process goes to step S16. The internal resistance value of the capacitor 19 is R3 or R4 illustrated in FIG. 6, for example. In step S16, an output restriction instruction for the capacitor 19 is transmitted from the controller 30 to the electrical energy storage system 120. As a result of this, the restriction is applied to the charge and discharge of the capacitor 19. The restriction on the charge and discharge includes limiting the charge and discharge currents to small values. By limiting the charge and discharge currents to and from the capacitor 19 to small values, it becomes possible to reduce the sudden voltage fall or voltage rise due to the increased internal resistance of the capacitor 19. With this arrangement, the voltage at the times of charge and discharge of the capacitor 19 at a low temperature can be held between the system lower limit voltage and the system upper limit voltage, for example. Further, the restrained output of the charge and discharge can warm up the capacitor 19.

After the process in step S16 is completed, in step S18, it is determined whether the operation of the shovel is completed. If the operation of the shovel is completed (YES in step S18), the output restriction process ends. If the operation of the shovel is not completed (NO in step S18), the output restriction process returns to step S14.

On the other hand, if it is determined that the current internal resistance value of the capacitor 19 is smaller than or equal to the threshold Rth for the internal resistance value (YES in step S15), the output restriction process goes to step S17. The internal resistance value of the capacitor 19 is R5 illustrated in FIG. 6, for example. In step S17, an output restriction cancel instruction for the capacitor 19 is transmitted from the controller 30 to the electrical energy storage system 120. As a result of this, the restriction on the charge and discharge of the capacitor 19 is canceled and an ordinary charge and discharge control for the capacitor 19 is performed.

After the process in step S17 is completed, in step S18, it is determined whether the operation of the shovel is completed. If the operation of the shovel is completed (YES in step S18), the output restriction process ends. If the operation of the shovel is not completed (NO in step S18), the output restriction process returns to step S13. This process is repeated until the working with the shovel is completed.

According to the output restriction process of the second embodiment described above, if the working with shovel is started when the temperature of the capacitor 19 is low, for example, the internal resistance of the capacitor 19 immediately after the operation of the shovel has been started is greater than the threshold Rth. Thus, the output restriction process goes to step S16 due to "NO" in step S15, resulting in the restriction on the output of the capacitor 19. When the internal resistance of the capacitor 19 becomes less than or equal to the threshold Rth after the operation of the shovel is continued and the capacitor 19 is in the warmed up status, the output restriction process goes to step S17 due to "YES" in step S15. As a result of this, the restriction on the output of the capacitor 19 is canceled and the ordinary charge and discharge control for the capacitor 19 can be applied. Because the restriction on the output of the capacitor 19 is canceled when the current internal resistance of the capacitor 19 derived based on the measurement becomes the threshold Rth, the restriction on the output can be canceled at the correct time, regardless of the degradation level of the capacitor 19. With this arrangement, even if the shovel is started up at the low temperature, it is possible to warm up the capacitor 19 while suppressing the degradation of the capacitor and thus immediately return to the ordinary charge and discharge control.

As described above, in the embodiment, the status of the capacitor 19 is detected based on the internal resistance value of the capacitor 19, and the internal resistance value of the capacitor 19 corresponds to a status value representing the status of the capacitor 19. Further, the status detector is implemented when the controller 30 calculates the internal resistance value of the capacitor 19 in step S14.

Third Embodiment

In the following, a third embodiment is described. In the third embodiment, the output restriction of the capacitor 19 and the cancellation thereof are performed based on a voltage change amount of the capacitor voltage at the time of applying the current to the capacitor.

Figure 8:
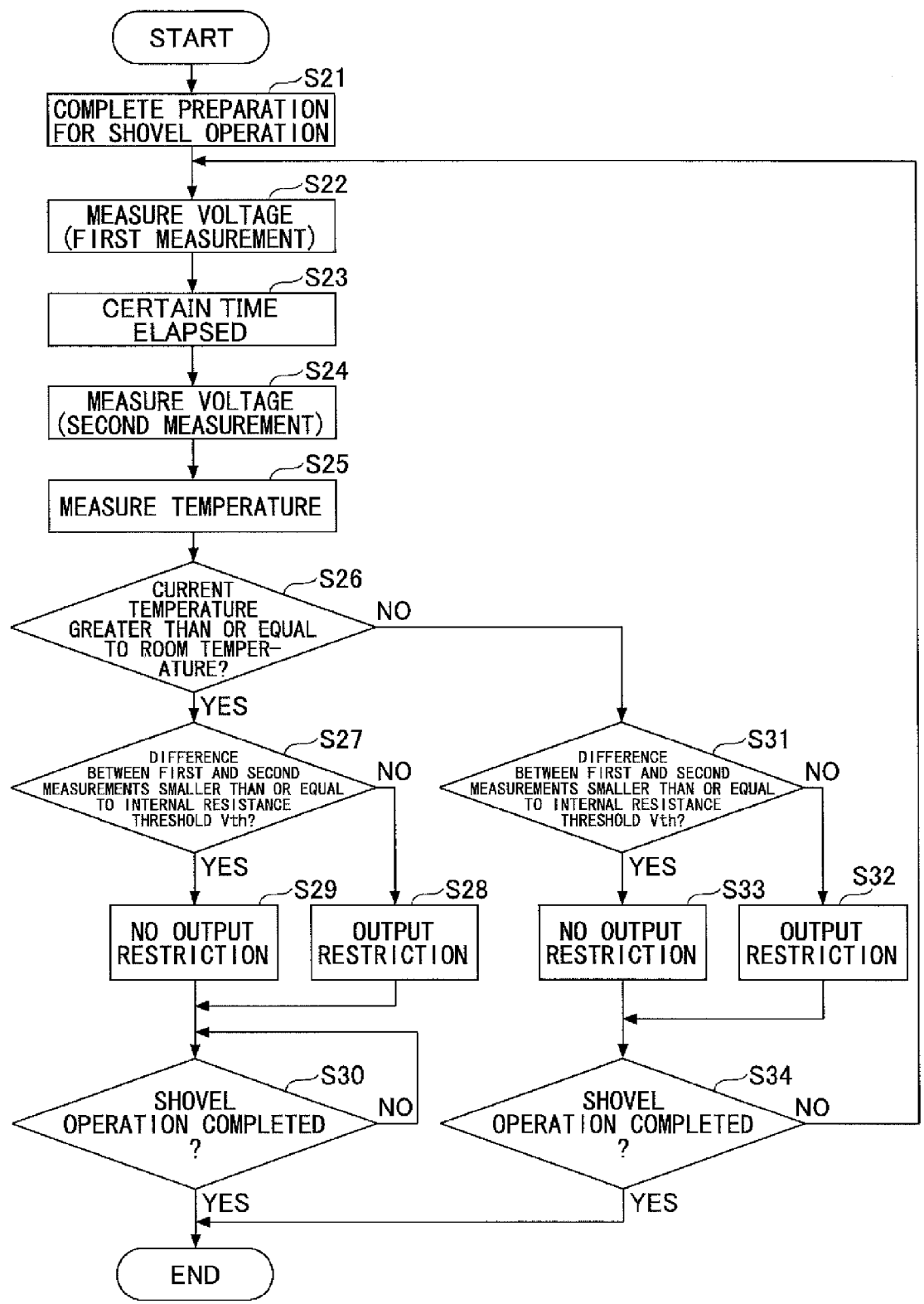
FIG. 8 is a flowchart of an output restriction process according to a third embodiment.
Figure 9:
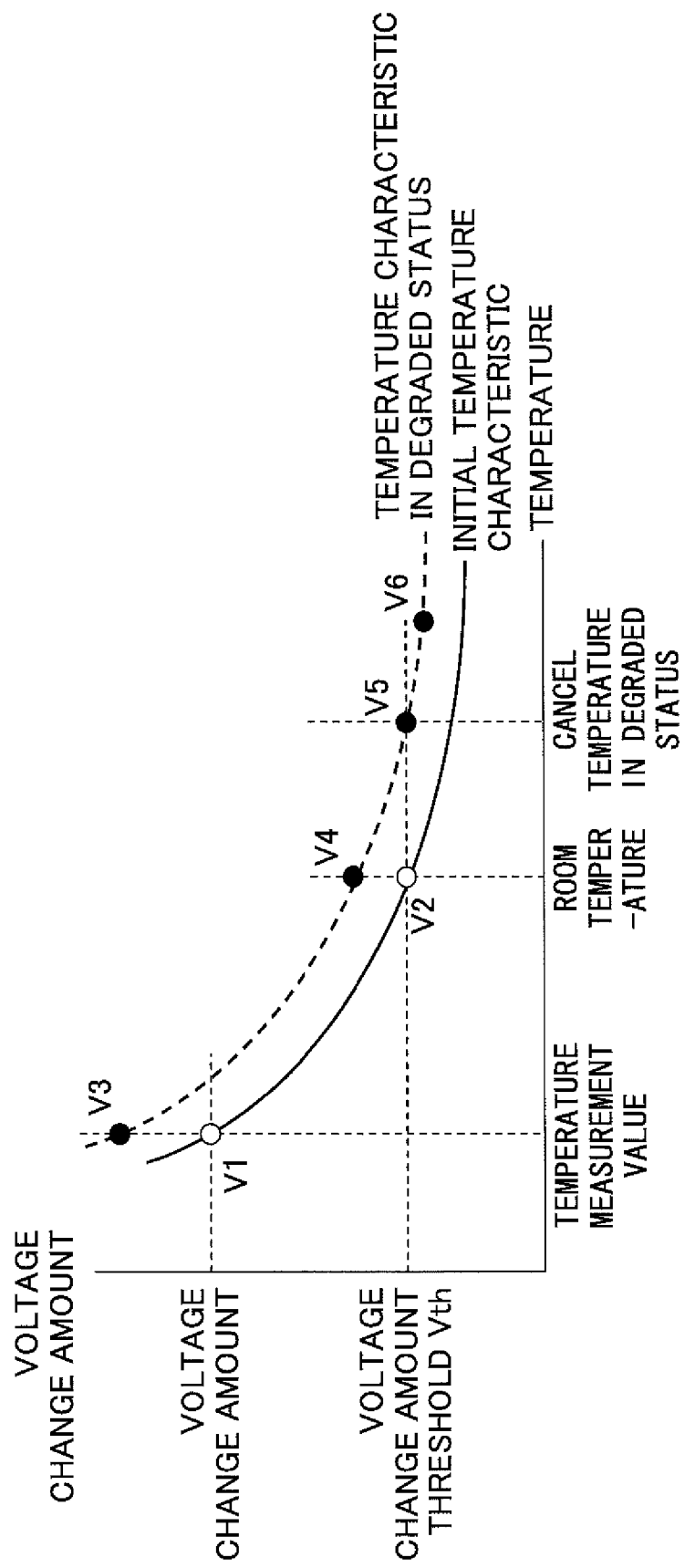
FIG. 9 is a graph for illustrating a relationship between temperature and voltage change amount of a capacitor.

FIG. 8 is a flowchart of an output restriction process according to the third embodiment. FIG. 9 is a graph for illustrating a relationship between temperature and voltage change amount of the capacitor.

The voltage change amount of the capacitor 19 corresponds to a voltage difference at the time of changing the current applied to the capacitor 19. In other words, for example, when it is assumed that the value of the current to the capacitor 19 is greatly changed from a first value to a second value, the voltage change amount corresponds to a difference (so-called "IR drop") between a first voltage at the current of the first current value and a second voltage at the current of the second current value. Thus, the voltage change amount can be regarded as being equivalent to the internal resistance of the capacitor 19, and the output restriction process can be executed using the voltage change amount instead of the internal resistance as in the second embodiment.

When, the output restriction process according to the third embodiment is started, at first, in step S21, the preparation for operating the shovel is completed and the working with the shovel is started. Thus, the motor generator (assist motor) 12 and the rotating motor 21 are in a status in which they can be driven. The motor generator 12 is driven, and the rotating motor 21 is driven due to the working. Next, in step S22, the voltage of the capacitor 19 is measured (first measurement). This measurement of the voltage is performed at timing when the current is being applied to the capacitor. Then, in step 23, the process is not performed until a certain time has elapsed. The certain time is set such that the current to the capacitor 19 sufficiently changes during the certain time. The certain time is a time interval of 0.2 through 0.3 sec, for example.

Next, in step S24, the voltage of the capacitor 19 is measured again (second measurement). By calculating the difference between the voltage obtained at the first measurement and the voltage obtained at the second measurement, the voltage change amount can be calculated. The voltage change amount thus calculated corresponds to the voltage change amount V1 or V2 illustrated in FIG. 9.

Then, in step S25, the current temperature of the capacitor 19 is calculated. In step 26, it is determined whether the current temperature of the capacitor 19 is greater than or equal to the room temperature. If it is determined that the current temperature of the capacitor 19 is greater than or equal to the room temperature (YES in step S26), it is determined that the temperature of the capacitor is not low, and the output restriction process goes to step S27.

In step S27, the difference between the voltage obtained at the first measurement in step S22 and the voltage obtained at the second measurement in step S24 is smaller than or equal to a threshold Vth. The threshold Vth for the voltage change amount is equivalent to the threshold Rth for the internal resistance in the second embodiment. If the voltage change amount is smaller than or equal to the threshold Vth, it can be regarded that the internal resistance of the capacitor 19 is less than or equal to the threshold Rth.

If it is determined that the difference between the voltage obtained at the first measurement and the voltage obtained at the second measurement is not smaller than or equal to the threshold Vth (NO in step S27), the output restriction process goes to step S28. The voltage change amount for which it is determined that the difference is not smaller than or equal to the threshold Vth corresponds to the voltage change amount V4 or V5 illustrated in FIG. 9. In this case, because it is determined that the current temperature of the capacitor 19 is greater than or equal to the room temperature in step S26, it can be determined that the fact that the voltage change amount is great means that the internal resistance of the capacitor 19 becomes great due to the degradation. Thus, in step S28, an output restriction instruction for the capacitor 19 is transmitted from the controller 30 to the electrical energy storage system 120. As a result of this, the restriction is applied to the charge and discharge of the capacitor 19. The restriction on the charge and discharge includes limiting the charge and discharge currents to small values. By limiting the charge and discharge currents to and from the capacitor 19 to small values, it becomes possible to reduce the sudden voltage fall or voltage rise due to the degradation of the capacitor 19 that causes the increased internal resistance of the capacitor 19. With this arrangement, the voltage at the times of charge and discharge of the capacitor 19 in the degraded status can be held between the system lower limit voltage and the system upper limit voltage, for example. Further, the restrained output of the charge and discharge can warm up the capacitor 19.

After the process in step S28 is completed, in step S30, it is determined whether the operation of the shovel is completed. If the operation of the shovel is completed (YES in step S30), the output restriction process ends. If the operation of the shovel is not completed (NO in step S30), the output restriction process repeats the process of step S30 until the operation of the shovel is completed. This is because it is not necessary to determine the voltage change amount again. Because the fact that the voltage change amount is great is due to the degradation of the capacitor 19 and the temperature of the capacitor 19 is greater than or equal to the room temperature (i.e., the temperature of the capacitor 19 is not low), the internal resistance of the capacitor 19 does not decrease from the current value.

On the other hand, if it is determined in step S27 that the voltage change amount of the capacitor 19 is smaller than or equal to the threshold Rth for the voltage change amount (YES in step S27), the output restriction process goes to step S29. The voltage change amount for which it is determined that the difference is smaller than or equal to the threshold Vth corresponds to the voltage change amount V2 or V6 illustrated in FIG. 9. In step S29, the restriction on the output of the capacitor 19 is not performed, or the output restriction cancel instruction for the capacitor 19 is transmitted from the controller 30 to the electrical energy storage system 120. As a result of this, the restriction on the charge and discharge of the capacitor 19 is not performed and the ordinary charge and discharge control for the capacitor 19 is performed.

Subsequent to step S29, in step S30, it is determined whether the operation of the shovel is completed. If the operation of the shovel is completed (YES in step S30), the output restriction process ends. If the operation of the shovel is not completed (NO in step S30), the output restriction process repeats the process of step S30 until the operation of the shovel is completed. This is because it is not necessary to determine the voltage change amount again. Because it can be determined, based on the fact that the voltage change amount is small, that the capacitor 19 is not degraded and the temperature of the capacitor 19 is greater than or equal to the room temperature (i.e., the temperature of the capacitor 19 is not low), it can be determined that the internal resistance of the capacitor 19 does not decrease from the current value.

On the other hand, in step S26, if it is determined that the current temperature of the capacitor 19 is not greater than or equal to the room temperature (NO in step S26), the output restriction process goes to step S31. Also in step S31, as in step S27, the difference between the voltage obtained at the first measurement in step S22 and the voltage obtained at the second measurement in step S24 is smaller than or equal to a threshold Vth.

If it is determined that the difference between the voltage obtained at the first measurement and the voltage obtained at the second measurement is not smaller than or equal to the threshold Vth (NO in step S31), the output restriction process goes to step S32. The voltage change amount for which it is determined that the difference is not smaller than or equal to the threshold Vth corresponds to the voltage change amount V1 or V3 illustrated in FIG. 9. In this case, because it is determined that the current temperature of the capacitor 19 is not greater than or equal to the room temperature (i.e., the temperature of the capacitor 19 is low) in step S26, it can be determined that the fact that the voltage change amount is great means that the internal resistance of the capacitor 19 becomes great due to the low temperature of the capacitor 19. Thus, in step S32, an output restriction instruction for the capacitor 19 is transmitted from the controller 30 to the electrical energy storage system 120. As a result of this, the restriction is applied to the charge and discharge of the capacitor 19. The restriction on the charge and discharge includes limiting the charge and discharge currents to small values. By limiting the charge and discharge currents to and from the capacitor 19 to small values, it becomes possible to reduce the sudden voltage fall or voltage rise due to the low temperature of the capacitor 19 that causes the increased internal resistance of the capacitor 19. With this arrangement, the voltage at the times of charge and discharge of the capacitor 19 in the degraded status can be held between the system lower limit voltage and the system upper limit voltage, for example. Further, the restrained output of the charge and discharge can warm up the capacitor 19.

After the process in step S32 is completed, in step S34, it is determined whether the operation of the shovel is completed. If the operation of the shovel is completed (YES in step S34), the output restriction process ends. If the operation of the shovel is not completed (NO in step S34), the output restriction process returns to step S22. This is because it can be predicted that a status in which the output restriction can be canceled will be formed, because the operation of the shovel is continued and the capacitor 19 is in the warmed up status to cause the internal resistance to decrease.

On the other hand, if it is determined in step S32 that the voltage change amount of the capacitor 19 is smaller than or equal to the threshold Rth for the voltage change amount (YES in step S32), the output restriction process goes to step S33. In step S33, the restriction on the output of the capacitor 19 is not performed, or the output restriction cancel instruction for the capacitor 19 is transmitted from the controller 30 to the electrical energy storage system 120. As a result of this, the restriction on the charge and discharge of the capacitor 19 is not performed and the ordinary charge and discharge control for the capacitor 19 is performed.

Subsequent to step S33, in step S34, it is determined whether the operation of the shovel is completed. If the operation of the shovel is completed (YES in step S34), the output restriction process ends. If the operation of the shovel is not completed (NO in step S34), the output restriction process returns to step S22. This is because there may be case of a status in which it becomes necessary to perform the output restriction when the temperature of the capacitor 19 becomes low and thus the internal resistance becomes great during the continued operation of the shovel. This process is repeated until the working with the shovel is completed.

According to the output restriction process of the third embodiment described above, if the working with shovel is started when the temperature of the capacitor 19 is low, for example, the internal resistance of the capacitor 19 immediately after the operation of the shovel has been started is greater than the threshold Rth and thus the voltage change amount is greater than the threshold Vth. Thus, the output restriction process goes to step S32 due to "NO" in step S26 via step S31, resulting in the restriction on the output of the capacitor 19. When the internal resistance of the capacitor 19 becomes less than or equal to the threshold Rth and thus the voltage change amount is smaller than or equal to the threshold Vth after the operation of the shovel is continued and the capacitor 19 is in the warmed up status, the output restriction process goes to step S33 due to "YES" in step S26 via step S31. As a result of this, the restriction on the output of the capacitor 19 is canceled and the ordinary charge and discharge control for the capacitor 19 can be applied. Because the restriction on the output of the capacitor 19 is canceled when the voltage change amount derived based on the measurement becomes less than or equal to the threshold Vth, that is to say, when the current internal resistance of the capacitor 19 derived based on the measurement becomes smaller than or equal to the threshold Rth, the restriction on the output can be canceled at the correct time, regardless of the degradation level of the capacitor 19. With this arrangement, even if the shovel is started up at the low temperature, it is possible to warm up the capacitor 19 while suppressing the degradation of the capacitor and thus immediately return to the ordinary charge and discharge control.

As described above, in the embodiment, the status of the capacitor is detected based on the voltage change amount of the capacitor 19, and the voltage change amount of the capacitor 19 corresponds to a status value representing the status of the capacitor 19. Further, the status detector is implemented when the controller 30 calculates the voltage change amount of the capacitor 19 in step S24.

Fourth Embodiment

In the following, a fourth embodiment is described. According to the fourth embodiment, as in the third embodiment, the output restriction of the capacitor 19 and the cancellation thereof are performed based on a voltage change amount of the capacitor voltage at the time of applying the current to the capacitor; however, according to the fourth embodiment, the degradation is not determined based on the current temperature of the capacitor 19.

Figure 10:
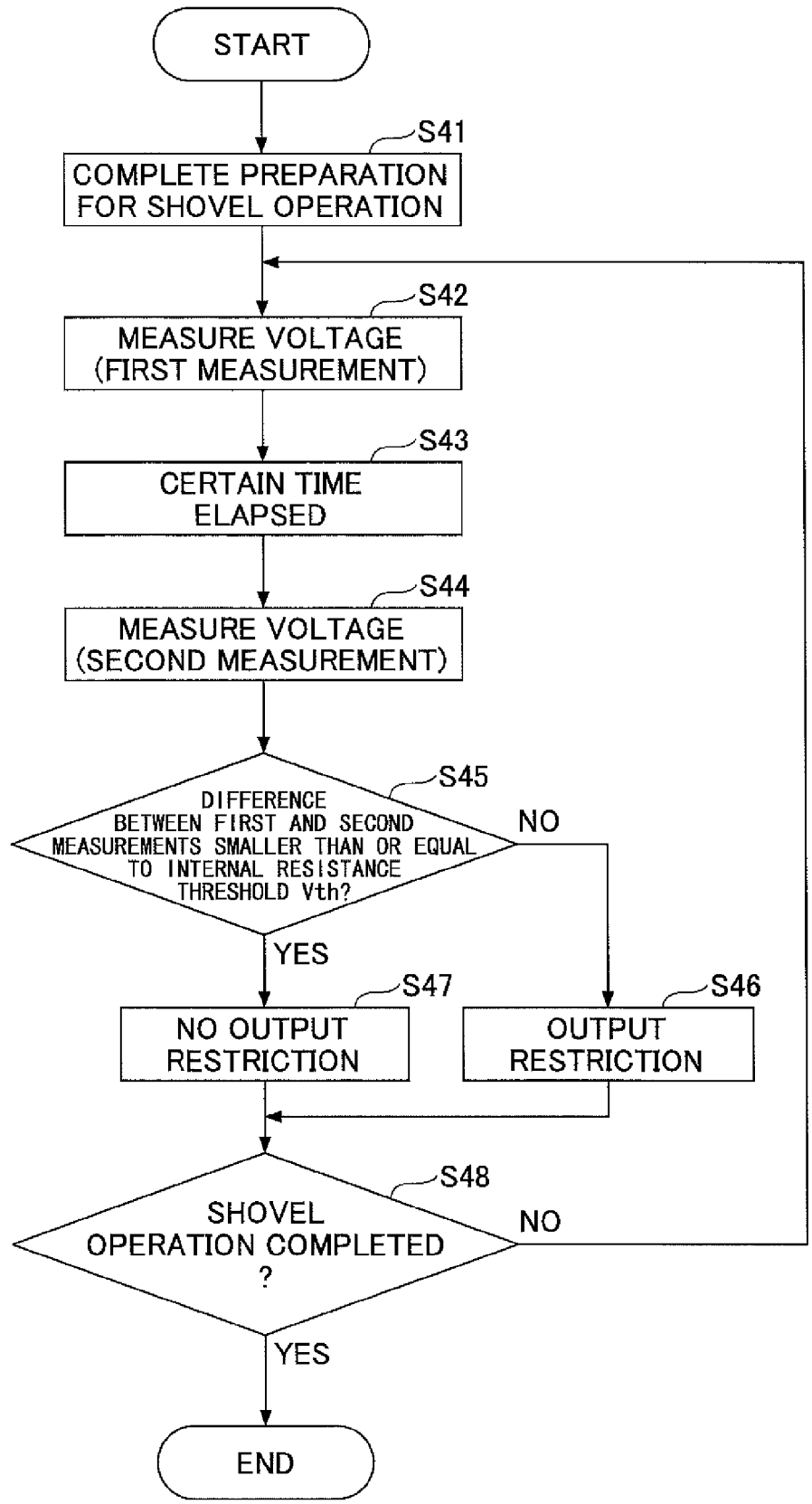
FIG. 10 is a flowchart of an output restriction process according to a fourth embodiment.
Figure 11:
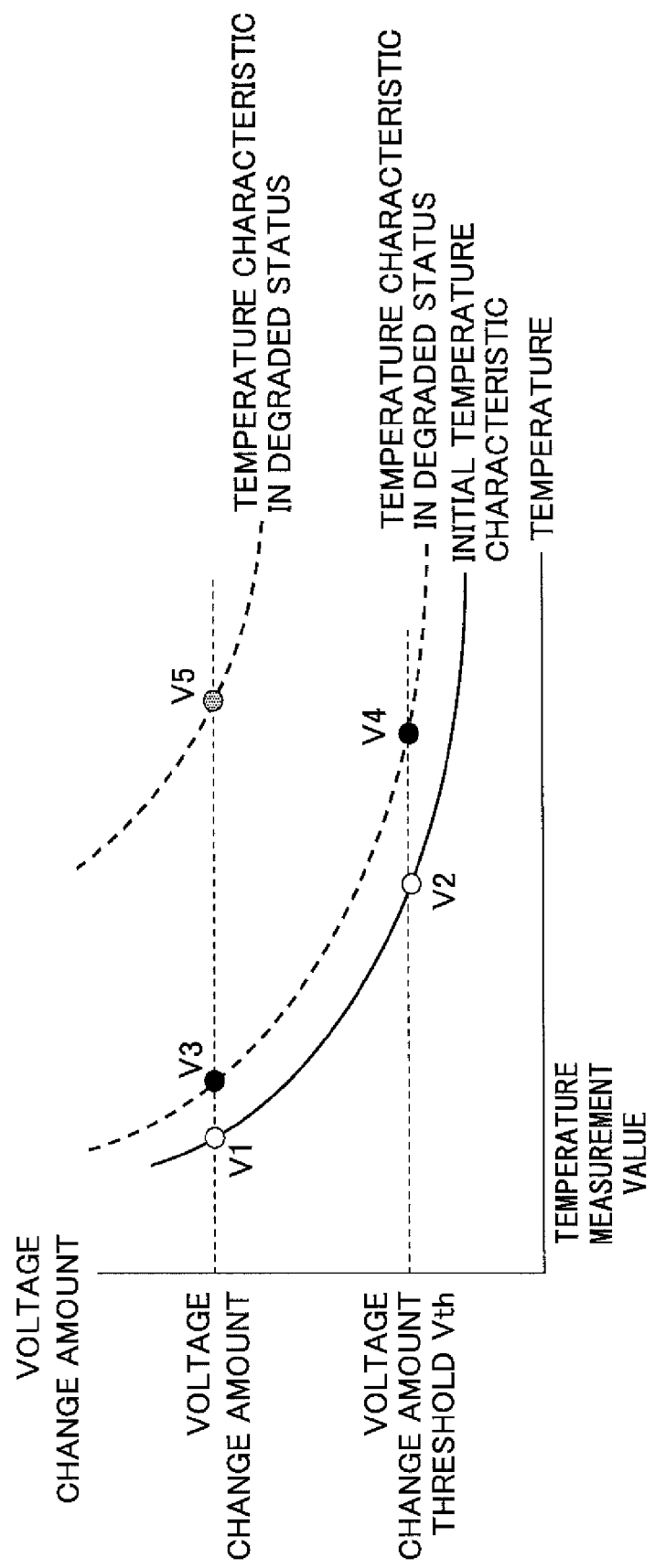
FIG. 11 is a graph for illustrating a relationship between temperature and voltage change amount of a capacitor.

FIG. 10 is a flowchart of an output restriction process according to the fourth embodiment. FIG. 11 is a graph for illustrating a relationship between temperature and voltage change amount of the capacitor.

When, the output restriction process according to the fourth embodiment is started, at first, in step S41, the preparation for operating the shovel is completed and the working with the shovel is started. Thus, the motor generator (assist motor) 12 and the rotating motor 21 are in a status in which they can be driven. The motor generator 12 is driven, and the rotating motor 21 is driven due to the working. Next, in step S42, the voltage of the capacitor 19 is measured (first measurement). This measurement of the voltage is performed at timing when the current is being applied to the capacitor. Then, in step 43, the process is not performed until a certain time has elapsed. The certain time is set such that the current to the capacitor 19 sufficiently changes during the certain time. The certain time is a time interval of 0.2 through 0.3 sec, for example.

Next, in step S44, the voltage of the capacitor 19 is measured again (second measurement). By calculating the difference between the voltage obtained at the first measurement and the voltage obtained at the second measurement, the voltage change amount can be calculated. The voltage change amount thus calculated corresponds to the voltage change amount V1, V3 or V5 illustrated in FIG. 11.

Then, in step S45, the difference between the voltage obtained at the first measurement in step S42 and the voltage obtained at the second measurement in step S44 is smaller than or equal to a threshold Vth.

If it is determined that the difference between the voltage obtained at the first measurement and the voltage obtained at the second measurement is not smaller than or equal to the threshold Vth (NO in step S45), the output restriction process goes to step S46. The voltage change amount for which it is determined in step S46 that the voltage change amount is not smaller than or equal to the threshold Vth corresponds to the voltage change amount V1, V3 or V5 illustrated in FIG. 11. In step S46, an output restriction instruction for the capacitor 19 is transmitted from the controller 30 to the electrical energy storage system 120. As a result of this, the restriction is applied to the charge and discharge of the capacitor 19. The restriction on the charge and discharge includes limiting the charge and discharge currents to small values. By limiting the charge and discharge currents to and from the capacitor 19 to small values, it becomes possible to reduce the sudden voltage fall or voltage rise due to the low temperature of the capacitor 19 that causes the increased internal resistance of the capacitor 19. With this arrangement, the voltage at the times of charge and discharge of the capacitor 19 in the degraded status can be held between the system lower limit voltage and the system upper limit voltage, for example. Further, the restrained output of the charge and discharge can warm up the capacitor 19.

After the process in step S46 is completed, in step S48, it is determined whether the operation of the shovel is completed. If the operation of the shovel is completed (YES in step S48), the output restriction process ends. If the operation of the shovel is not completed (NO in step S48), the output restriction process returns to step S42. This is because it can be predicted that a status in which the output restriction can be canceled will be formed, because the operation of the shovel is continued and the capacitor 19 is in the warmed up status to causes the internal resistance to decrease.

On the other hand, if it is determined in step S45 that the voltage change amount of the capacitor 19 is smaller than or equal to the threshold Rth for the voltage change amount (YES in step S45), the output restriction process goes to step S47. The voltage change amount for which it is determined in step S45 that the voltage change amount is smaller than or equal to the threshold Vth corresponds to the voltage change amount V2 or V4 illustrated in FIG. 11. In step S47, the restriction on the output of the capacitor 19 is not performed, or the output restriction cancel instruction for the capacitor 19 is transmitted from the controller 30 to the electrical energy storage system 120. As a result of this, the restriction on the charge and discharge of the capacitor 19 is not performed and the ordinary charge and discharge control for the capacitor 19 is performed.

Subsequent to step S47, in step S48, it is determined whether the operation of the shovel is completed. If the operation of the shovel is completed (YES in step S48), the output restriction process ends. If the operation of the shovel is not completed (NO in step S48), the output restriction process returns to step S42. This is because there may be case of a status in which it becomes necessary to perform the output restriction when the temperature of the capacitor 19 becomes low and thus the internal resistance becomes great during the continued operation of the shovel. This process is repeated until the working with the shovel is completed.

According to the output restriction process of the fourth embodiment described above, if the working with shovel is started when the temperature of the capacitor 19 is low, for example, the internal resistance of the capacitor 19 immediately after the operation of the shovel has been started is greater than the threshold Rth and thus the voltage change amount is greater than the threshold Vth. Thus, the output restriction process goes to step S46 due to "NO" in step S45, resulting in the restriction on the output of the capacitor 19. When the internal resistance of the capacitor 19 becomes less than or equal to the threshold Rth and thus the voltage change amount is smaller than or equal to the threshold Vth after the operation of the shovel is continued and the capacitor 19 is in the warmed up status, the output restriction process goes to step S47 due to "YES" in step S45. As a result of this, the restriction on the output of the capacitor 19 is canceled and the ordinary charge and discharge control for the capacitor 19 can be applied. Because the restriction on the output of the capacitor 19 is canceled when the voltage change amount derived based on the measurement becomes smaller than or equal to the threshold Vth, that is to say, when the current internal resistance of the capacitor 19 derived based on the measurement becomes less than or equal to the threshold Rth, the restriction on the output can be canceled at the correct time, regardless of the degradation level of the capacitor 19. With this arrangement, even if the shovel is started up at the low temperature, it is possible to warm up the capacitor 19 while suppressing the degradation of the capacitor and thus immediately return to the ordinary charge and discharge control.

As described above, in the embodiment, the status of the capacitor is detected based on the voltage change amount of the capacitor 19, and the voltage change amount of the capacitor 19 corresponds to a status value representing the status of the capacitor 19. Further, the status detector is implemented when the controller 30 calculates the voltage change amount of the capacitor 19 in step S44.

Figure 12:
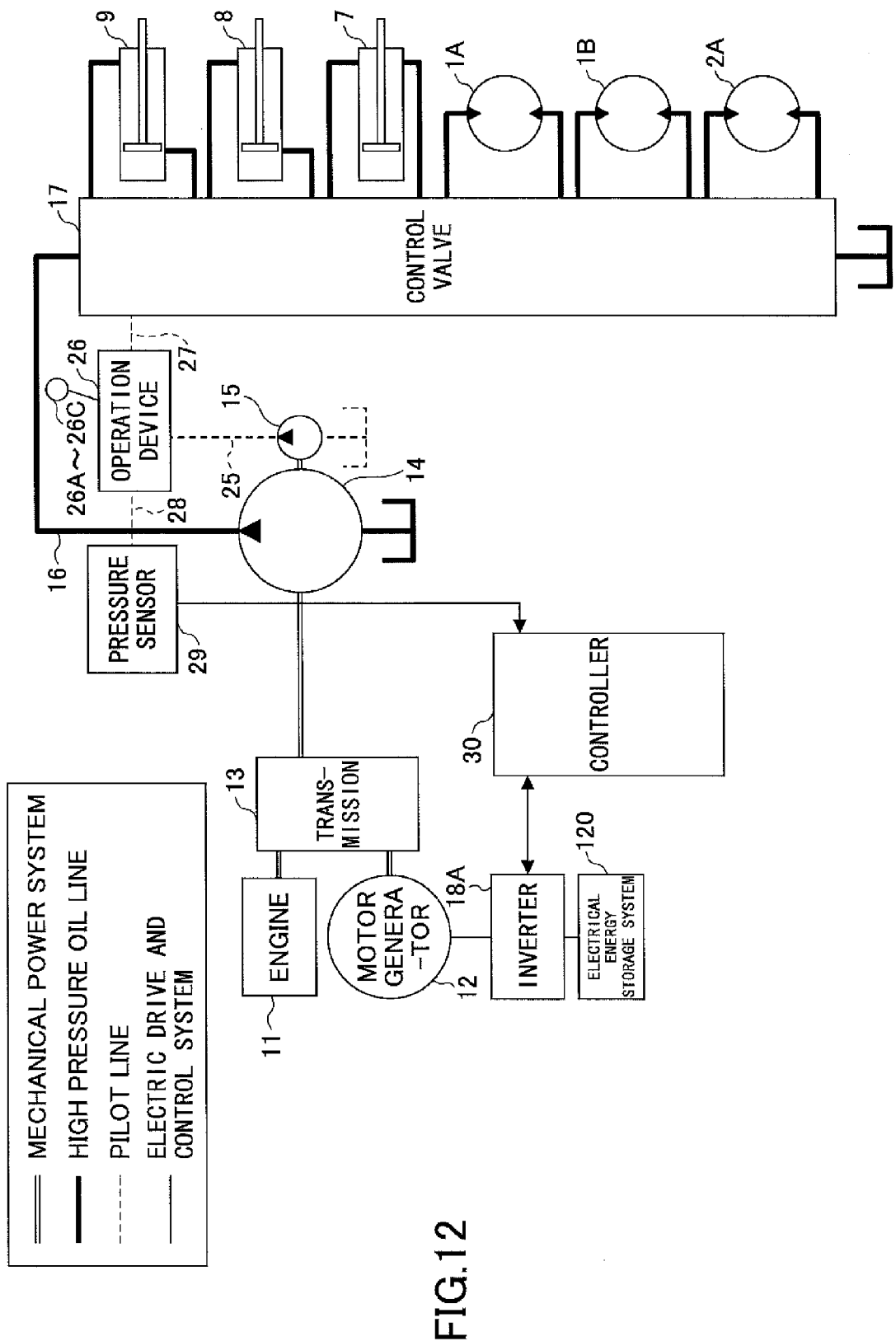
FIG. 12 is a block diagram for illustrating a drive system of the hybrid shovel in the case where a rotating mechanism is of a hydraulic drive type.

It is noted that, in the embodiments described above, the rotating mechanism 2 is electrically driven; however, the rotating mechanism 2 may be hydraulically driven. FIG. 12 is a block diagram for illustrating a drive system when the rotating mechanism of the hybrid shovel illustrated in FIG. 3 is replaced with a hydraulic rotating mechanism. According to the hybrid shovel illustrated in FIG. 12, a hydraulic motor 2A for rotating the upper rotating body is connected to the control valve 17, and the rotating mechanism 2 is driven by the hydraulic motor 2A. Even for such a hybrid shovel, the output restriction process for the capacitor 19 can be executed as in the embodiments described above.

Further, in the embodiments described above, the present invention is applied to a so-called parallel type hybrid shovel in which the main pump 14, which is a hydraulic pump to which the engine 11 and the motor generator 12 is connected, is driven. The present invention can be applied to a so-called series type hybrid shovel in which the motor generator 12 is driven by the engine 11, and the main pump 14 is driven by an electric motor 400 using only electric power in the electrical energy storage system 120 that has been generated by the motor generator 12. In this case, the motor generator 12 has a function as a generator driven by the engine 11 only to generate electric power in the embodiment.

Figure 13:
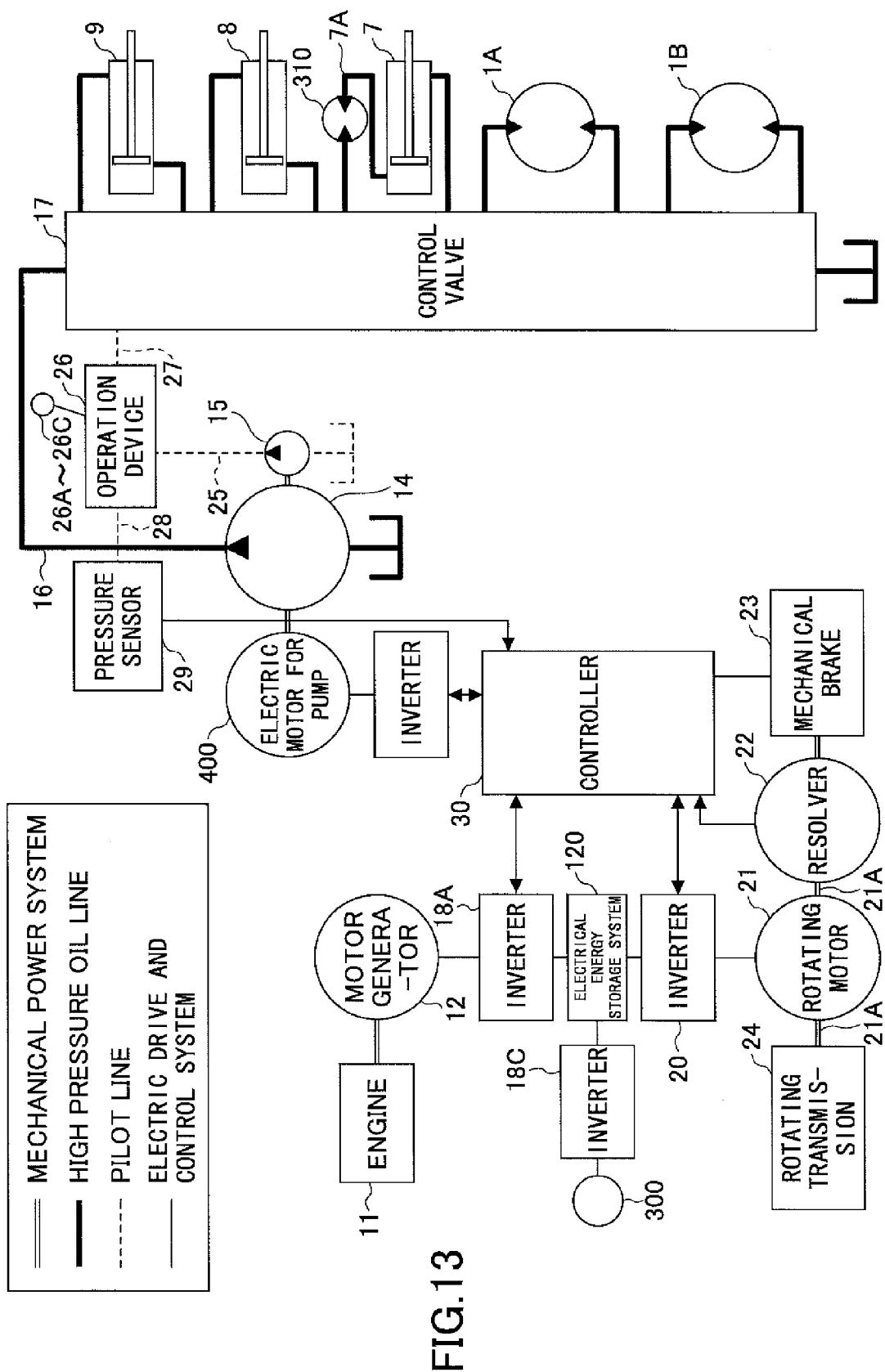
FIG. 13 is a block diagram for illustrating a drive system of a series type hybrid shovel.

It is noted that, in the hybrid shovel illustrated in FIG. 13, return oil from the boom cylinder 7 is utilized to hydraulically regenerate power. Specifically, a boom regenerative hydraulic motor 310 is provided in a hydraulic pipe 7A for the return oil from the boom cylinder 7 such that a generator 300 is driven by the boom regenerative hydraulic motor to generate the regenerative electric power. The electric power generated by the generator 300 is supplied to the electrical energy storage system 120 via an inverter 18C.

Figure 14:
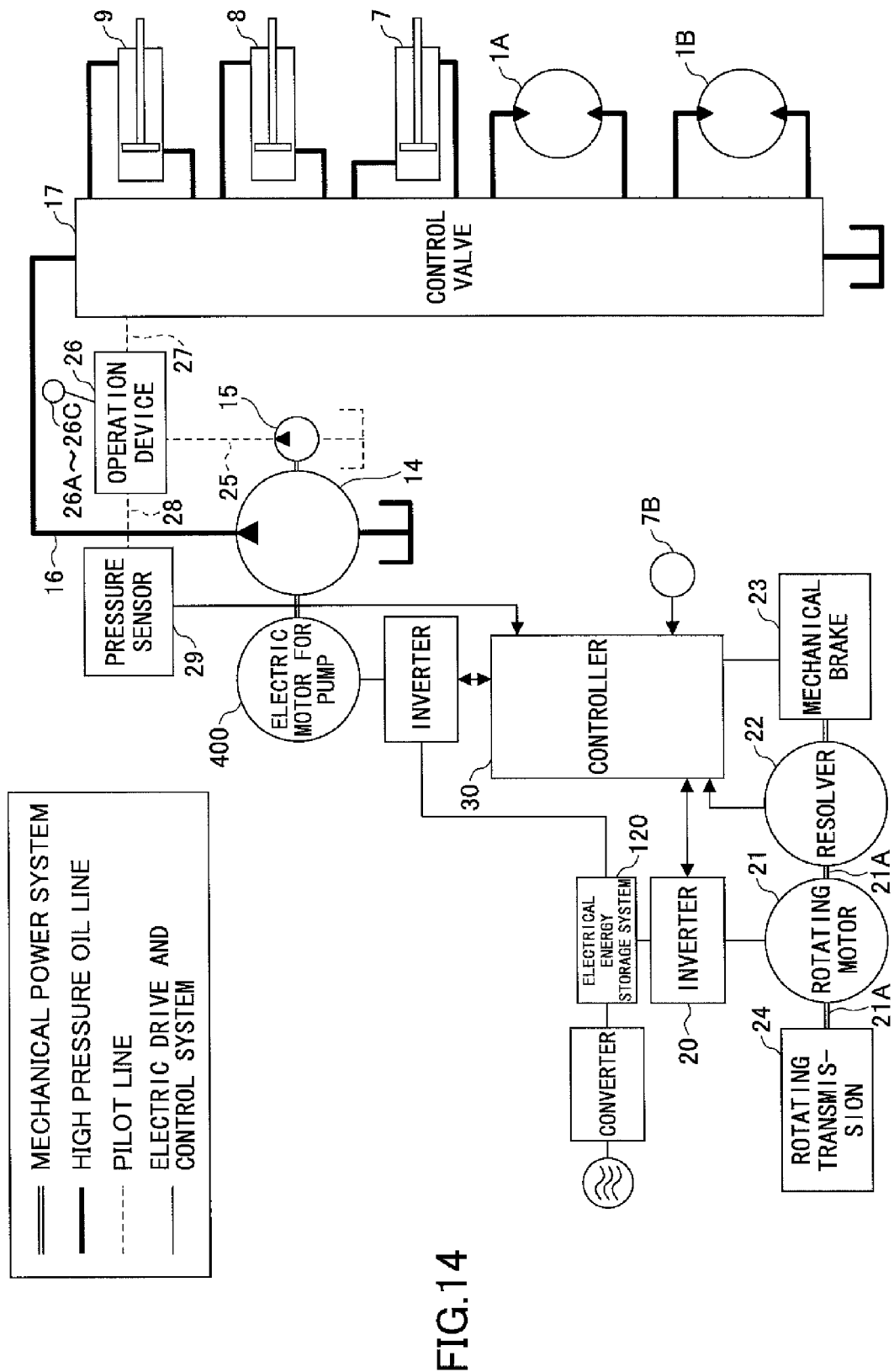
FIG. 14 is a block diagram for illustrating a drive system of an electric shovel.

Further, the present invention can be applied to an electric shovel such as illustrated in FIG. 14 as well as a hybrid shovel. The electric shovel illustrated in FIG. 14 does not have the engine 11. The electric motor 400 and the rotating motor 21 are driven by the electric power from an external power supply. The main pump 14 is driven by the electric motor 400 only. The electric motor 400 consumes the electric power from the electrical energy storage system 120 only.

In the specification, the present invention is disclosed with reference to the embodiments of the hybrid shovel. However, it should be understood that the present invention is not limited to the above-described embodiments, and variations and modifications may be made without departing from the scope of the present invention.

The present invention can be applied to a shovel which includes an electrical energy storage device for supplying electric power to an electrical load.

The present application is based on and claims the benefit of priority of Japanese Priority Application No. 2011-143262, filed on Jun. 28, 2011, the entire contents of which are hereby incorporated by reference.

What is claimed is:

1. A shovel, comprising:
a lower traveling body;
an upper rotating body provided on the lower traveling body;
an electrical energy storage device provided on the upper rotating body;
a converter connected to the electrical energy storage device;
a status detector that detects a status value representing a status of the electrical energy storage device; and
a controller that controls the converter to perform charge or discharge control of the electrical energy storage device at the time of starting up the shovel, wherein
the controller applies a current to the electrical energy storage device and the converter at the time of starting up the shovel, calculates the status value after having applied the current, compares the detected status value with a predetermined value, and controls the converter based on a comparison result to restrict an output of the electrical energy storage device, the status value is a value of an internal resistance of the electrical energy storage device that is calculated based on a current value or a voltage value of the electrical energy storage device, the current value and the voltage value being detected by the status detector when the current is applied to the electrical energy storage device and the converter at the time of starting up the shovel, the controller restricts the output of the electrical energy storage device such that a charge/discharge current of the electrical energy storage device becomes lower when the calculated value of the internal resistance becomes higher, and such that the voltage value does not exceed an upper limit voltage and does not fall below a lower limit voltage, and the controller continues to restrict the output of the electrical energy storage device until the calculated value of the internal resistance becomes the predetermined value.

2. A shovel, comprising:
a lower traveling body;
an upper rotating body provided on the lower traveling body;
an electrical energy storage device provided on the upper rotating body;
a converter connected to the electrical energy storage device;
a status detector that detects a status value representing a status of the electrical energy storage device; and
a controller that controls the converter to perform charge or discharge control of the electrical energy storage device at the time of starting up the shovel,
wherein
the controller applies a current to the electrical energy storage device and the converter at the time of starting up the shovel, calculates the status value after having applied the current, compares the detected status value with a predetermined value, and controls the converter based on a comparison result to restrict an output of the electrical energy storage device,
the status value is a temperature of the electrical energy storage device,
the controller calculates a value of an internal resistance of the electrical energy storage device based on a current value or a voltage value of the electrical energy storage device, calculates, based on the calculated value of the internal resistance, a temperature as the predetermined value at which the internal resistance becomes smaller than or equal to a threshold,
the controller restricts the output of the electrical energy storage device such that a charge/discharge current of the electrical energy storage device becomes lower when the internal resistance of the electrical energy storage device becomes higher, and such that the voltage value does not exceed an upper limit voltage and does not fall below a lower limit voltage,
the controller continues to restrict the output of the electrical energy storage device until the temperature of the electrical energy storage device becomes the calculated temperature.

3. A shovel, comprising:
a lower traveling body;
an upper rotating body provided on the lower traveling body;
an electrical energy storage device provided on the upper rotating body;
a converter connected to the electrical energy storage device;
a status detector that detects a status value representing a status of the electrical energy storage device; and
a controller that controls the converter to perform charge or discharge control of the electrical energy storage device at the time of starting up the shovel,
wherein
the controller applies a current to the electrical energy storage device and the converter at the time of starting up the shovel, detects the status value after having applied the current, compares the detected status value with a predetermined value, and controls the converter based on a comparison result to restrict an output of the electrical energy storage device,
the controller restricts the output of the electrical energy storage device such that a charge/discharge current of the electrical energy storage device becomes lower when an internal resistance of the electrical energy storage device becomes higher, and such that a voltage value of the electrical energy storage device does not exceed an upper limit voltage and does not fall below a lower limit voltage,
the status value is a voltage change amount corresponding to a voltage difference between a voltage, which is detected when the current is applied to the electrical energy storage device and the converter at the time of starting up the shovel, and a voltage, which is detected after a predetermined time elapses from the time of starting up the shovel, and
the controller continues to restrict the output of the electrical energy storage device until the voltage change amount becomes the predetermined value.

* * * * *